US008730974B2

(12) United States Patent  
Karaoguz et al.

(10) Patent No.: US 8,730,974 B2  
(45) Date of Patent: May 20, 2014

(54) COLLECTION OF ENHANCED CALLER ID INFORMATION

(75) Inventors: Jeyhan Karaoguz, Irvine, CA (US); Noel Whitley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 2547 days.

(21) Appl. No.: 11/153,266

(22) Filed: Jun. 15, 2005

(65) Prior Publication Data

US 2005/0232247 A1    Oct. 20, 2005

Related U.S. Application Data

(63) Continuation-in-part of application No. 11/095,376, filed on Mar. 30, 2005, now Pat. No. 7,536,177.

(60) Provisional application No. 60/563,894, filed on Apr. 16, 2004.

(51) Int. Cl.  
*H04L 12/56* (2011.01)

(52) U.S. Cl.  
USPC ...... 370/395.71; 370/331; 370/352; 370/401; 370/328; 370/338; 455/415; 455/403; 455/432.1; 455/436; 455/439; 455/440; 455/441; 455/442; 455/443

(58) Field of Classification Search  
USPC .......... 455/415, 403; 370/352, 401, 328, 338, 370/395.71  
See application file for complete search history.

(56) References Cited

U.S. PATENT DOCUMENTS

| | | | | |
|---|---|---|---|---|
| 5,995,843 | A * | 11/1999 | Sjodin et al. | 455/462 |
| 6,853,711 | B2 * | 2/2005 | Brisebois et al. | 379/142.06 |
| 2003/0022659 | A1 * | 1/2003 | Mun et al. | 455/415 |
| 2005/0190792 | A1 * | 9/2005 | Dunk | 370/469 |
| 2005/0198525 | A1 * | 9/2005 | Trossen et al. | 713/200 |

* cited by examiner

*Primary Examiner* — Justin Lee  
(74) *Attorney, Agent, or Firm* — Brinks Gilson & Lione

(57) ABSTRACT

Network entities such as an access device and a gateway analyze messages exchanged during a communication session to identify information items of interest such as, for example, email addresses, universal resource locators, file paths, and attachments. References to and/or the contents of the identified information items may be stored in a database that associates the identified information items with the participants of the communication session. The participants in the communication session may be identified by conventional caller ID information, or by an Internet protocol address, an electronic serial number, or a variety of other identifiers. Information received at the beginning of a later communication session that identifies participant(s) in that communication session may then be used to select from the database, information items from previous communication session, that are associated with the identified participant in the current communication session. Information about the selected information items may be delivered as enhanced caller ID information to parties of the communication session, allowing them to have easy access to the previously exchanged information.

18 Claims, 15 Drawing Sheets

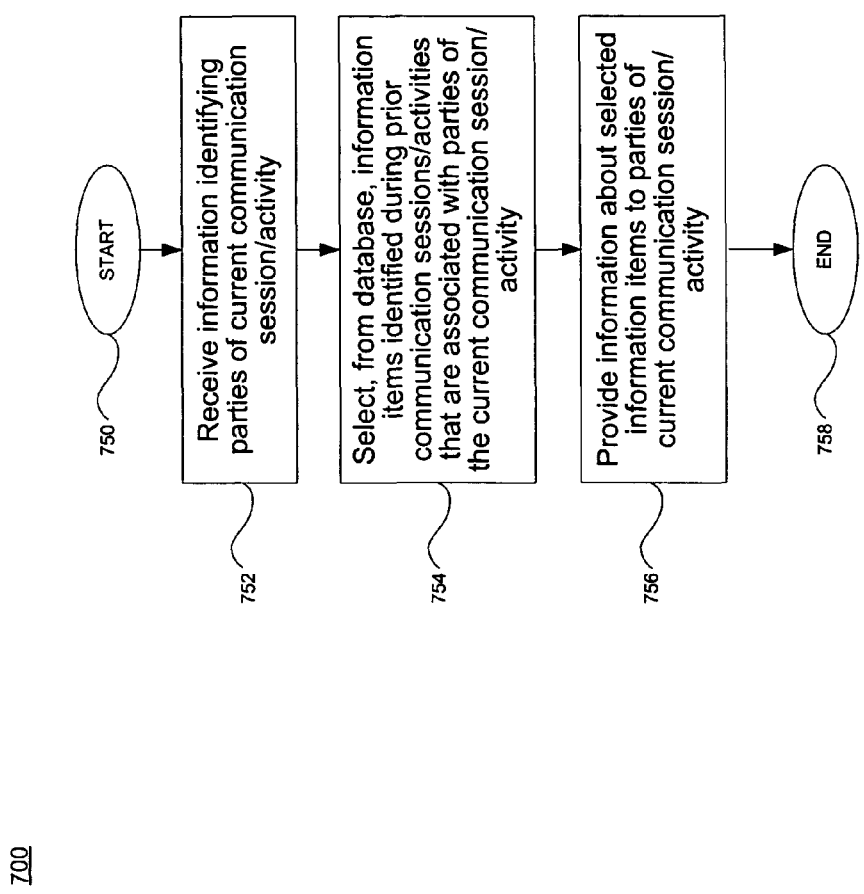

12# COLLECTION OF ENHANCED CALLER ID INFORMATION

RELATED APPLICATIONS

The present application is a continuation-in-part of prior U.S. patent application Ser. No. 11/095,376, entitled "Enhanced Caller ID Information Based On Access Device Information Via A Broadband Access Gateway", filed Mar. 30, 2005 now U.S. Pat. No. 7,536,177, which makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004. The complete subject matter of each of the above-referenced applications is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

The present application also makes reference to U.S. patent application Ser. No. 11/095,188, entitled "Location-Aware Application Based Quality of Service (QoS) Via A Broadband Access Gateway", filed Mar. 30, 2005, the complete subject matter of which is hereby incorporated herein by reference, in its entirety.

The present application also makes reference to U.S. patent application Ser. No. 11/093,938 entitled "Extended Call Handling Functionality Using Multi-Network Simulcasting", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

A rapidly growing number of consumers and professionals engage in electronic forms of communication such as email, instant messaging, and voice communication. Items of information that may be of longer term importance to the participants may be exchanged during a voice call or within text messaging, for example. A party may include a spreadsheet, a video clip and/or still image, an email address, or a universal resource locator, for example, as part of the exchange. At the present time, it is up to the participants in an exchange to keep notes or records of the subject matter of their communications, and the information that was exchanged that may be of later importance. At some later point in time, one of the participants of an earlier exchange may contact another of the participants. In the case of a voice or video call, for example, the person initiating contact knows the reason for making contact, and may have already gathered the materials they wish to discuss. The person being contacted, however, can only guess the reason for the contact before actually answering the call, even when they have conventional caller ID service. Some email applications may permit the searching of email subject lines and body text for strings of interest. Upon receiving a voice call, a user may use this capability to access all email containing a particular text string related to the subject of the call. In spite of this type of tool, when parties to a call revisit a particular subject, call participants may struggle to recall and/or produce a document and/or attachment that was exchanged during a prior call, hampering the discussion.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting collection of enhanced caller identification information, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 7B shows a flowchart illustrating an exemplary method supporting the delivery of enhanced caller ID information using the database of information items identified during the collection of enhanced caller identification (ID) information illustrated in FIG. 7A, in accordance with a representative embodiment of the present invention.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to the identification, collection, storage, and delivery of information items that may be used to provide enhanced caller identification (caller ID) information to an access device such as, for example, a mobile multimedia handset, personal computer, or personal digital assistant, to name only a few such devices. The enhanced caller ID information may comprise, for example, links to or actual copies of selected items of information referenced and/or exchanged during, for example, a voice call session, in an email, and/or in instant messaging exchanged between access devices over a communication network. The identification, collection, storage, and delivery of the enhanced caller identification information may be supported, for example, by a broadband access gateway that permits broadband network access via, for example, a personal cellular microcell, a personal area network (PAN), a wired or wireless wide area network (WAN), wireless local area network (WLAN) or other type of network located within a premises such as a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to information related to prior user call sessions may be simplified, permitting more effective communication between users of access devices in, for example, homes, offices, and businesses.

Figure 1:
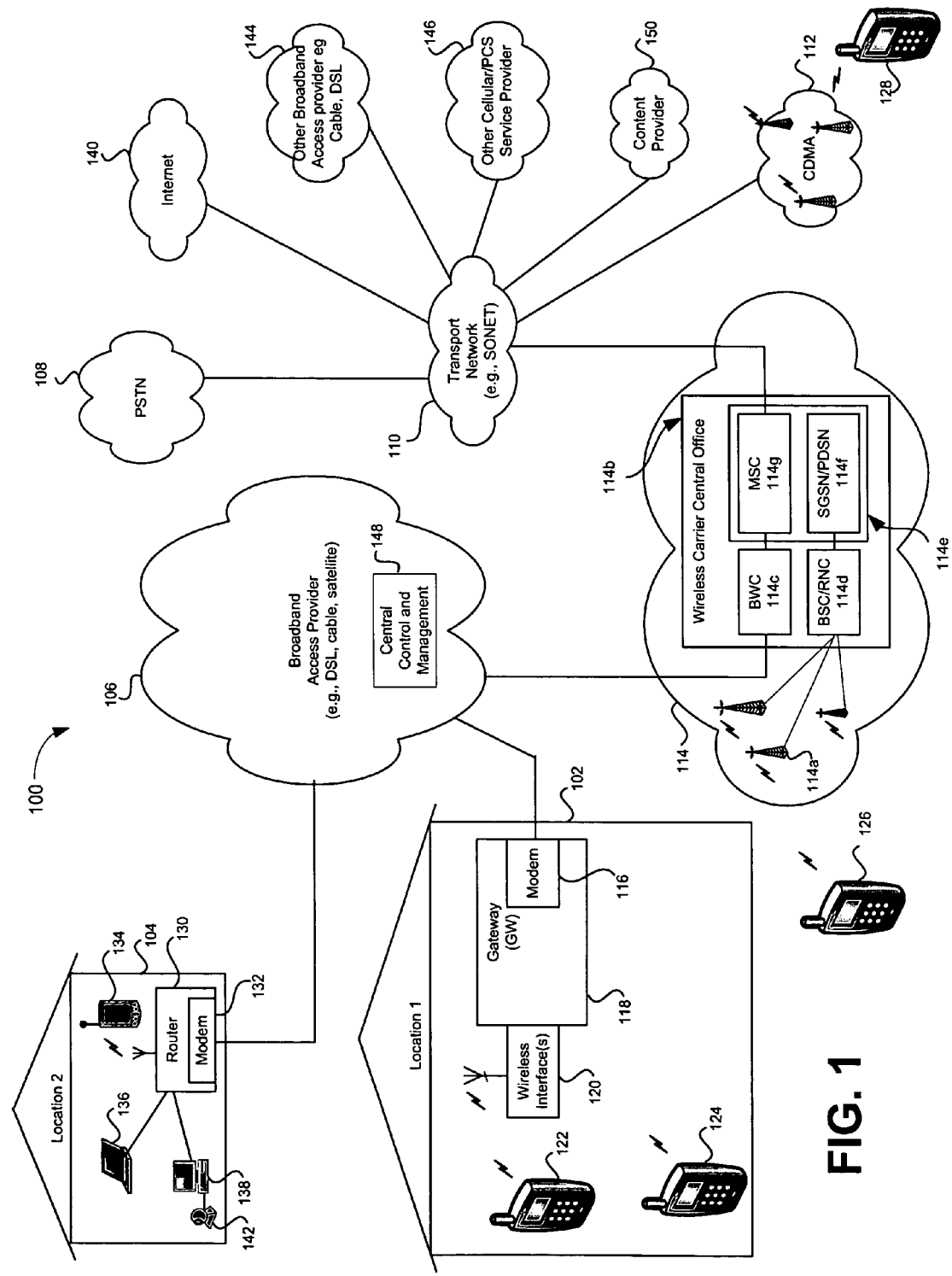
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/ radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device. A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
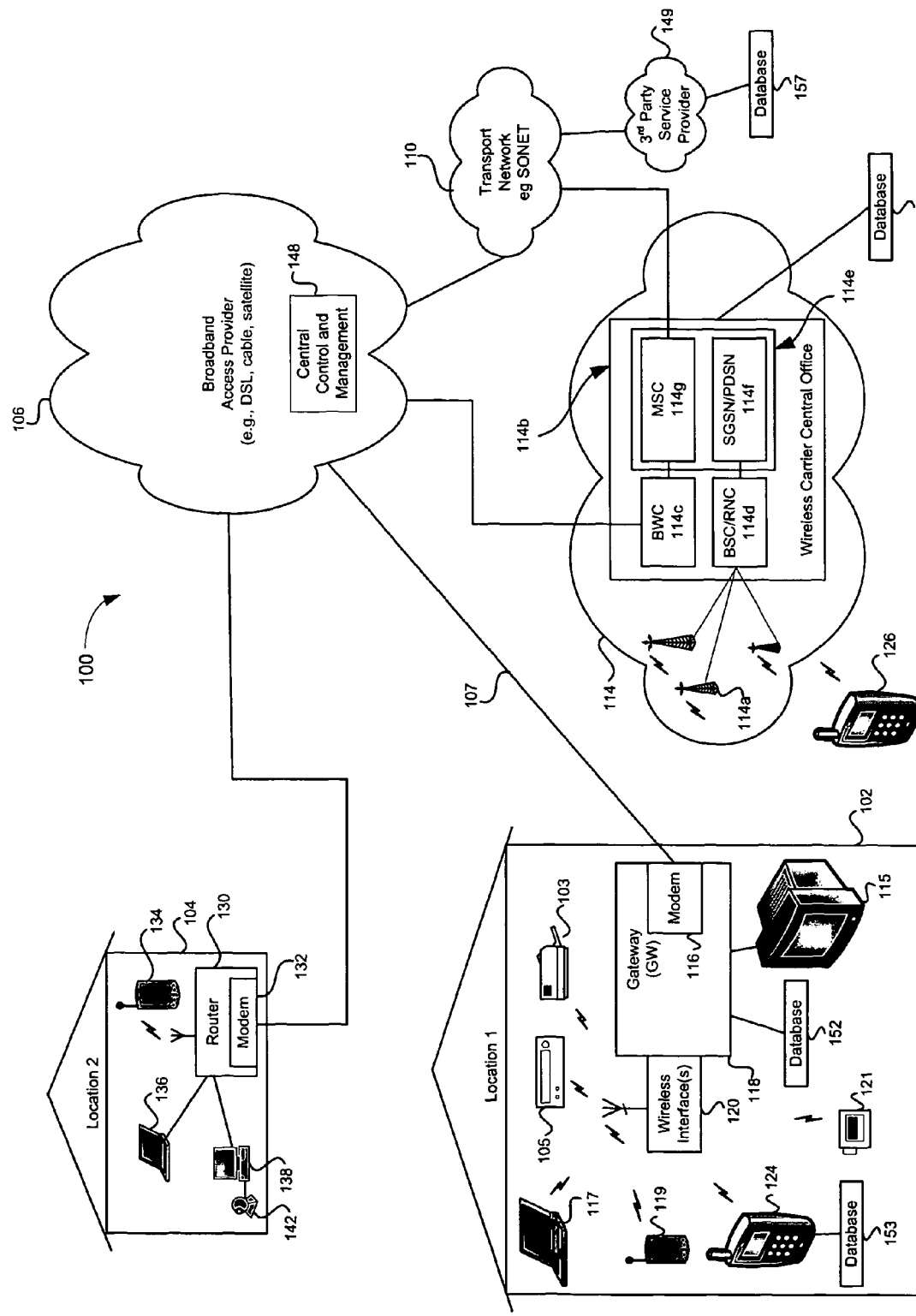
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11 a, b, g, and/or n interface, and/or an IEEE 802.15.3a ultra-wideband interface. Although the following discussion refers frequently to the capabilities and actions of the gateway 118 and wireless interface 120, the same may be said of the router 130 with the modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842, entitled "Registering Access Device Multimedia Content Via A Broadband Access Gateway", filed Mar. 30, 2005, the complete subject matter of which is hereby incorporated herein by reference, in its entirety.

In a representative embodiment in accordance with the present invention, the user of an access device such as, for example, the access devices 124, 126, the wireless PDA 119, and the laptop 117 of FIG. 2 may receive a call via a wireless network such as, for example, the GSM network 114 or via a broadband network such as, for example, using the gateway 118 with wireless interface 120 and the broadband connection 107. The incoming call may be received, for example, when the access device is not currently engaged in a call, or it may be received during a previously established call. Information identifying the calling party, generally referred to as "caller ID" information, may be included in the messaging that notifies the access device 124 of the incoming call, or the caller ID information may be sent in separate messaging. Although in this example the call is received via the GSM network 114, it should be noted that the telephone call and the associated caller ID information may be received by an access device in communication with any of the networks of FIG. 1 such as, for example, the Internet 140, the CDMA network 112, the PSTN 108, and the other cellular/PCS service provider 146, without departing from the spirit and scope of the present invention. In a representative embodiment of the present invention, the call may originate from within, for example, the GSM network 114, or any of the networks that are accessible via the network serving the called party. This includes communication networks such as, for example, the PSTN 108, the CDMA network 112, and the Internet 140 shown in FIG. 1.

In various representative embodiments of the present invention, the caller ID information received by the access device 124 may comprise, for example, the directory number of the calling party, the name of the calling party, both the directory number and the name of the calling party, or some other form of calling party identification to be described in greater detail below. Although the present discussion focuses primarily on the development/collection of enhanced caller ID information for a directory number, a representative embodiment of the present invention is equally applicable to providing enhanced caller ID information associated with other forms of calling party identification including, for example, electronic serial numbers, Internet protocol (IP) addresses, media access control (MAC) addresses, International Mobile Station Identifier (IMSI) addresses, Mobile Identification Number (MIN) addresses, and International Mobile Equipment Identity (IMEI) addresses, to name only a few such identifiers.

In a representative embodiment of the present invention, a database such as, for example, the databases 152, 153, 156, 157 of FIG. 2 may be used to collect the contents of, and/or references or pointers to, various items of multimedia information that are identified during a communication session of an access device such as, for example, the access device 124 or the wireless PDA 134. Such items of multimedia information may, for example, be automatically identified by elements of the communication system 100 such as the access device 153, the gateway 118, and the wireless carrier central office 114*b*, and/or they may be explicitly identified by a user of an access device. For example, items such as email and instant messages, email addresses, universal resource locators, multimedia attachments, and other items of information exchanged during and/or related to the communication session may be associated with the caller identification (ID) of the calling and/or called party. Such items may be stored in a database such as, for example, the databases 152, 153, 156, 157 and may be associated with one or more of the participants. The databases 152, 153, 156, 157 may be accessible to the user of an access device such as the access device 124 or wireless PDA 134, or the laptop 117 or PC 138, for example. In various representative embodiments of the present invention, a user may elect to review and/or modify information stored in the databases 152, 153, 156, 157 to add, change, or delete references or pointers to, and/or the content of the databases. Such modifications may be made before, during, or after a call is in session. This may enable a user to make additional multimedia information available for sharing before a call is placed, remove those items that are no longer to be shared, and to manage storage requirements for the multimedia information items and references, particularly when such databases reside on devices having limited storage (e.g., the access device 124), or for which storage service charges are incurred. The user of an access device such as, for example, the access device 124 may, at some later time, engage in another communication session with a party of a previous communication session, during which references or pointers to, and/or items of information such as those described above were automatically collected, associated, and stored. In a representative embodiment of the present invention, the user of the access device 124 that receives or initiates a call may be automatically provided with immediate access to the items in the databases 152, 153, 156, 157 that are related to past communication sessions with the called/calling party. In this fashion, a user of an access device such as, for example, the access device 124 may be provided with easy access to information that was the subject of prior communication session with the called/calling party, enabling the user of the access device 124 to engage in more effective communication with the called/calling party. Although the databases 152, 153, 156, 157 of FIG. 2 are shown in communication with the gateway 118, the access device 124, the wireless carrier central office 114*b*, and the $3^{rd}$ party service provider 149, respectively, in a representative embodiment of the present invention such databases may, for example, reside within the infrastructure of a broadband access provider such as the BAP 106, in a broadband access gateway or router such as broadband access gateway 118 or the router 132, and/or at various locations accessible via the BAP 106 and/or the transport network 110, to name just a few possible locations.

Figure 3:
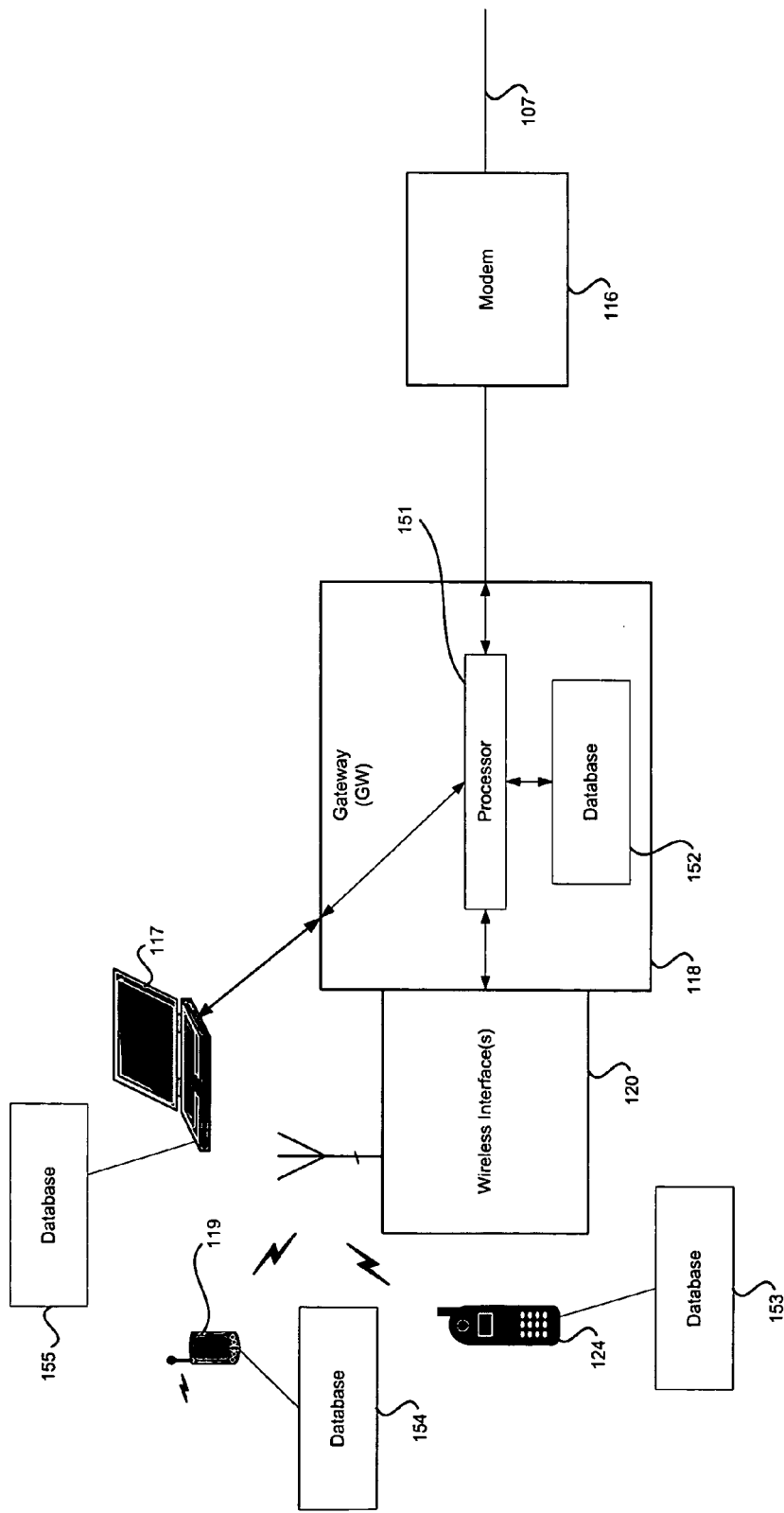
FIG. 3 shows a block diagram illustrating greater detail of a communication system that may correspond, for example, to a portion of the communication system of FIG. 2, that supports enhanced caller ID information, in accordance with a representative embodiment of the present invention.

FIG. 3 shows a block diagram illustrating greater detail of a communication system 300 that may correspond, for example, to a portion of the communication system 100 of FIG. 2, that supports enhanced caller ID information, in accordance with a representative embodiment of the present invention. The communication system 300 of FIG. 3 comprises a gateway 118 communicatively coupled to a wireless interface 120, a modem 116, and a laptop 117. The wireless interface 120, the modem 116, and the laptop 117 may correspond, for example, to the wireless interface 120, the modem 116, and the laptop 117 of FIG. 2. The modem 116 provides the gateway 118 with access to a broadband connection 107 that may, for example, comprise a digital subscriber line (DSL) connection, a cable network connection, a satellite connection, a T1 or T3 network connection, or similar broadband communication link. As shown in FIG. 3, the wireless interface 120 is communicatively coupled to access device 124, that may correspond, for example, to the access device 124 of FIG. 2. The wireless interface 120 may comprise any combination of interfaces such as, for example, a Bluetooth interface, and IEEE 802.11 a, b, g and/or n interface, and/or an IEEE 802.15.3a ultra-wideband interface.

As shown in the illustration of FIG. 3, the gateway 118 may comprise a processor 151 that is communicatively coupled to the wireless interface 120, the modem 116, and the laptop 117. In a representative embodiment according to the present invention, the processor 151 may be capable of accessing a database 152 that contains a collection of information about the various multimedia information sources accessible to the gateway 118, that may be useful in providing enhanced caller ID information to a user. The information resident in the database 152 of gateway 118 may be collected, for example, either at start of communication of an access device with the gateway 118, or periodically during the period while an access devices is in communication with the gateway 118.

In other representative embodiments of the present invention, an access device such as, for example, the access device 124 may comprise a database like the database 152, that contains a collection of information about various multimedia information sources that may be used to provide enhanced caller ID information. Such a database is shown in the illustration of FIG. 3 as database 153, accessible to the access device 124. The wireless PDA 119 and laptop 117 may also comprise similar databases 154, 155, respectively, that may be used to identify sources of multimedia information that may be used in the provision of enhanced caller ID information to a user. In addition, a representative embodiment of the present invention may employ databases located on network entities accessible by the gateway 118 of FIGS. 2 and 3, and the router 130 of FIG. 2 such as, for example, a server accessible via a broadband network such as the content provider 150 of FIG. 1, for example. Information about such sources of multimedia information may be provided by an access device to the gateway 118 when the access device first comes into communication with the gateway 118, or at any point thereafter. In one representative embodiment of the present invention, the gateway 118 may use such information to identify multimedia information associated with caller ID information. In another representative embodiment, the access device 124 may use the database 153 to identify multimedia information associated with caller ID information, and may provide identified information to the user of the access device 124, or to the gateway 118.

In one representative embodiment of the present invention, an access device such as, for example, the access device 124 of FIG. 3 may forward received caller ID information to a broadband access gateway such as, for example, the gateway 118, using the personal area network and/or wireless wide area network supported by the wireless interface 120, described above. Upon receiving the caller ID information, the gateway 118 may use the received caller ID information to perform a search of a database such as, for example, the database 152, to identify potential sources of multimedia information that may be related to or associated with the received caller ID information. The multimedia information in such sources may comprise various combinations of, for example, streaming video, broadcast video, voice, digital data, text, digitized audio, digitized still images, digitized video, and digitized music. The gateway 118 may then retrieve from those potential sources multimedia information associated with database items or fields matching the received caller ID information. In a representative embodiment of the present invention, a match for the received caller ID information may exist, for example, within the multimedia information, or in metadata that describes the multimedia information. Once matching multimedia information has been identified, the gateway 118 may provide to the access device of the called party a selected set of the identified multimedia information. Delivery of the selected information may employ either a wireless interface such as, for example, the wireless interface 120 of FIG. 3, or a broadband network such as, for example, the broadband connection 107 of FIG. 3. In a representative embodiment of the present invention, the information identifying a called/calling party and the selected information associated with the called/calling party may be exchanged via either the personal area and/or wireless wide area network, or via the broadband network, described above, permitting users of access devices to receive the benefits of enhanced caller ID whether in the personal area network/wireless wide area network coverage area of the wireless interface 120, or the wide area network served by, for example, the CDMA network 114.

In a representative embodiment of the present invention, the entries in the databases 152, 153, 154 may refer to multimedia information sources specifically identified by the user of the access device 124 receiving the caller ID information. For example, the entries may comprise information identifying a local or remote source of multimedia information such as an IP address, a universal resource locator (URL), an access device identifier, a file path or filename, and a file type, to name only a few possibilities. A user of an access device such as, for example, the access device 124 may identify to a broadband access gateway such as, for example, the gateway 118 those data sources to be used during the preparation of enhanced caller ID information. In a representative embodiment of the present invention, a list of the identified sources may be stored in the gateway 118 and associated with the user or with an access device. In another representative embodiment, the list may be stored in the access device and provided to the gateway 118 at or following commencement of communication between the access device and the gateway 118. In yet another representative embodiment, the list may be communicated along with the numeric caller ID information, at the time that the call is received.

In another representative embodiment of the present invention, the entries in the databases 152, 153, 154 may refer to multimedia information sources that have been automatically identified by the gateway 118 using predefined criteria. For example, a portion of a name or an associated type of an information source may be defined as an indicator that the information source is likely to contain multimedia information items associated with directory numbers, or with another form of caller identification. The majority of software applications store data in files having specifically assigned file types or file extensions, or having specific keywords or indicator values stored as metadata associated with the file. Files having file types or extensions associated with programs for managing personal or business telephone directories or contact lists, and files having metadata that is accessible for searching may, for example, represent valuable sources of additional information related to a caller. A data file associated with a contact manager application, for instance, may store professional and/or personal information for an individual, in addition to the directory number of the person. A broadband access gateway in a representative embodiment of the present invention may seek out and search information sources such as these that may be expected to contain information comprising a directory number or other form of caller identification. Identified items in such information sources may then be forwarded to the access device of the called party, to enable the called party to have additional details about the calling party at their disposal.

In yet another representative embodiment of the present invention, the entries in a database such as, for example, the databases 152, 153, 154 may refer to multimedia information sources that have been automatically identified by the gateway 118 using a set of heuristics. A broadband access gateway such as, for example, the gateway 118 may search through all accessible multimedia information sources, including those of access devices accessible via the personal area network supported by the wireless interface 120, and those accessible through wired connections such as, for example, the laptop 117 and the broadband connection 107. Searches of the contents of accessible multimedia information sources may, for example, be performed directly by the gateway 118, or they may be performed by search capabilities that are accessible to, and return search results to the gateway 118. The results of the search may be presented to a user of the access device 124, and the user may designate whether the items relate to the identified caller. This approach may permit such an embodiment of the present invention to determine which of the heuristics and search capabilities used are more or less reliable in identifying multimedia information sources containing useful, caller-related information.

In still another representative embodiment of the present invention, the entries in a database such as, for example, the databases 152, 153, 154 may contain links and/or references to multimedia information items exchanged by the user of the access device 124 during prior call(s) with another (called or calling) party. The links and/or references (e.g., pointers) in the databases 152, 153, 154 may be identified as being associated with parties with whom the user of access device 124 has exchanged the referenced multimedia information. For example, the user of the access device 124 and a second party may have engaged in one or more previous call session(s), and may have exchanged multimedia information, links, or references to such information, during the call session. The access device 124, the gateway 118, a network entity such as the wireless carrier central office 114*b* and/or the third party service provider 149 of FIG. 2, for example, may observe such exchanged items and/or links, and may place entries in a database such as the databases 152, 153, 154 of FIG. 3, for example, to associate the second party with the links or references to those items that were exchanged, and/or to store copies of the exchanged multimedia information items.

Upon receiving information identifying a called/calling party (e.g., at the initiation of and/or during a subsequent call session), the user of the access device 124 may automatically be provided with an itemized list, group of icons, or other form of presentation representing the multimedia information items, links, or references that have been exchanged during prior call session(s) with the second party. For example, during a call session with a second party, a user of an access device such as, for example, the access device 124 may send a video clip, a spreadsheet, or another form of multimedia information, or a link or reference to such information, to the second party. A broadband access gateway such as the gateway 118 or the access device 124, for example, may observe such information being exchanged during the call session, and may record such an exchange in a database such as the databases 152, 153, 154, for example. At some later point in time, the user of the access device 124 may place/receive a call to/from the second party, and may be presented at that time with a list of items, a group of icons, and/or links that represent the items of multimedia information previously exchanged with the second party. In addition, information about multimedia information items may be shared with the called party, at the placement of a call or at some later point in during the call. In this manner, the users of access devices at one or both ends of a call may immediately have access to information and materials that may have been related to prior calls sessions, enabling the users of the access devices to be better prepared to effectively communicate with other parties.

In a representative embodiment of the present invention, enhanced caller ID information shared by a calling party at initiation of a call may be stored when the called party fails to answer the call. For example, if a first party places a call to a second party, and the first party has elected to share items of multimedia information related to the call, references or pointers to, and/or the contents of the shared multimedia information items may be stored, for later access by the called party. Such information may be stored in a database on a called access device such as, for example, the access device 124 or laptop 117 of FIG. 3, a gateway such as the gateway 118 of FIG. 3, or they may be stored in a network-based entity such as the wireless carrier central office 114b and/or 3$^{rd}$ party service provider 149, for example. Depending upon the nature of the shared multimedia information items (e.g., file size, file format, complexity of content), the called party may employ an access device like, for example, the access device 124 and/or the laptop 117 of FIGS. 2 and 3, to later access the stored items that were shared by the caller of the unanswered call.

Figure 3A:
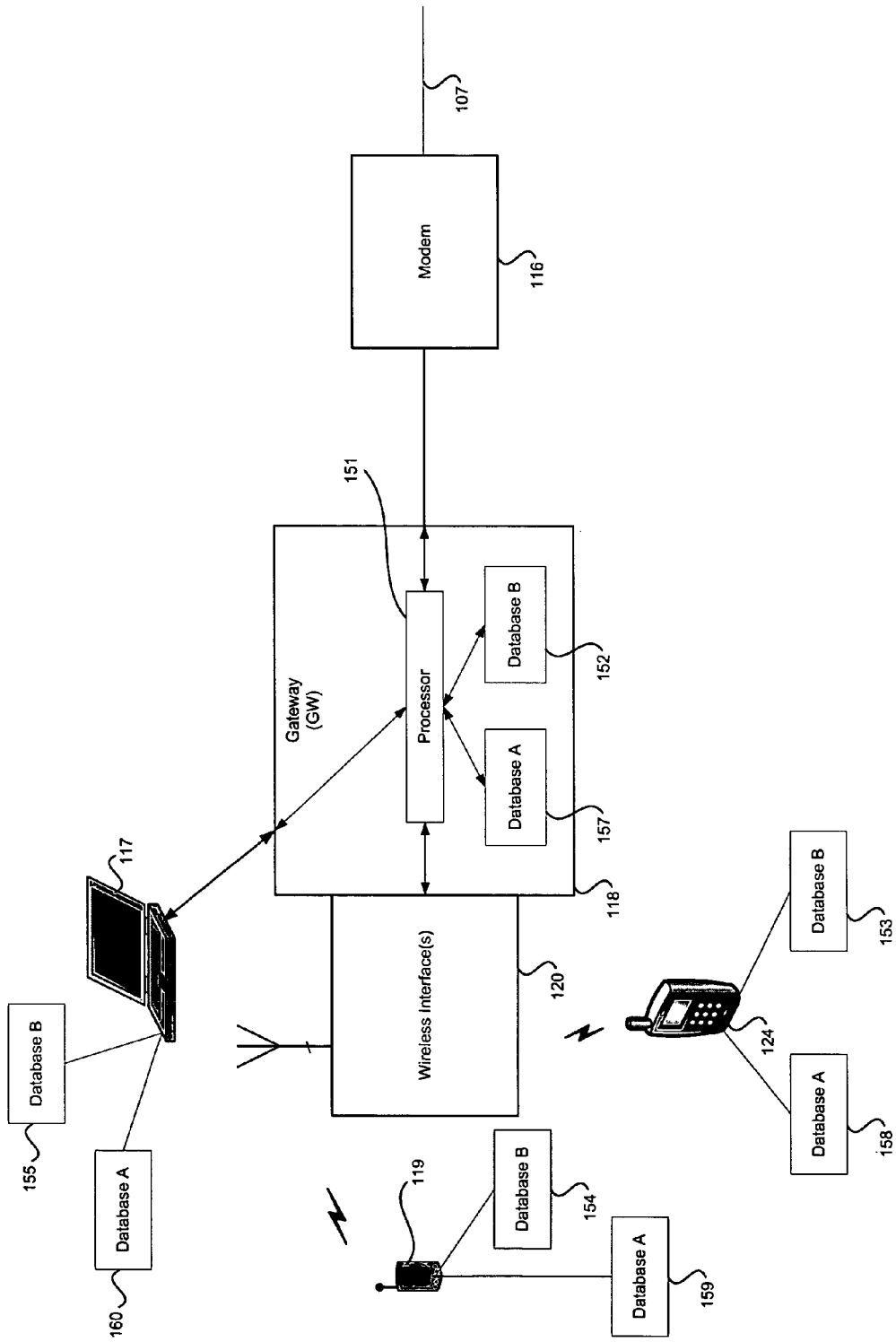
FIG. 3A shows a block diagram illustrating greater detail of a communication system that may correspond, for example, to a portion of the communication system of FIG. 2, that supports the collection and use of enhanced caller ID information, in accordance with a representative embodiment of the present invention.

FIG. 3A shows a block diagram illustrating greater detail of a communication system 300 that may correspond, for example, to a portion of the communication system 100 of FIG. 2, that supports the collection and use of enhanced caller ID information, in accordance with a representative embodiment of the present invention. The communication system 300 of FIG. 3A comprises a gateway 118 communicatively coupled to a wireless interface 120, a modem 116, and a laptop 117. The gateway 118, the wireless interface 120, the modem 116, and the laptop 117 may correspond, for example, to the gateway 118, the wireless interface 120, the modem 116, and the laptop 117 of FIG. 2. The modem 116 provides the gateway 118 with access to a broadband connection 107 that may, for example, comprise a digital subscriber line (DSL) connection, a cable network connection, a satellite connection, a T1 or T3 network connection, or similar broadband communication link. As shown in FIG. 3A, the wireless interface 120 is communicatively coupled to an access device 124, that may correspond, for example, to the access device 124 of FIG. 2. The wireless interface 120 may comprise any combination of interfaces such as, for example, a Bluetooth interface, an IEEE 802.11 a, b, g and/or n interface, and/or an IEEE 802.15.3a ultra-wideband interface.

In the illustration of FIG. 3A, the gateway 118 comprises a processor 151 that is communicatively coupled to the wireless interface 120, the modem 116, and the laptop 117. In a representative embodiment according to the present invention, the processor 151 may be capable of accessing a database A 157 and a database B 152. The database A 157 of FIG. 3A may, for example, represent a collection of references or pointers to, and/or content of information items identified and/or exchanged during a communication activity, and may correspond, functionally, to the databases 152, 153, 156, 157 of FIG. 2. Each of the entries in the database A 157 of FIG. 3A may be associated with participants in the call communication. The database B 152 of FIG. 3A may contain a collection of information about various multimedia information sources accessible to the gateway 118 and may correspond functionally to, for example, the databases 152, 153, 154, 155 of FIG. 3. As described above, in a representative embodiment of the present invention, a database such as the databases B 152, 153, 154, 155 of FIG. 3A and databases A 157, 158, 159, 160 of FIG. 3A may be located at any of a number of locations within a communication system such as, for example, the communication systems 100 of FIGS. 1 and 2. As described above with respect to FIG. 3, the information resident in the database B 152 of gateway 118 may be collected, for example, either at start of communication of an access device with the gateway 118, or periodically during the period while an access devices is in communication with the gateway 118, from various sources accessible to the gateway 118. In contrast, the information in the database A 157 may be collected from the content of a call, or may be explicitly identified by a user, and may be stored in the database A 157 that associates the exchanged or identified multimedia information with participants in the call session. In some representative embodiments of the present invention, databases such as those represented by database A 157 and database B 152 may reside together on a single device.

In other representative embodiments of the present invention, an access device such as, for example, the access device 124 of FIG. 3A may comprise a database that contains a collection of information about various multimedia information sources that may be used to provide enhanced caller ID information to a user. Such a database is shown in the illustration of FIG. 3A as database B 153, accessible to the access device 124. The wireless PDA 119 and laptop 117 may also comprise similar databases shown in FIG. 3A as database B 154 and database B 155, respectively, that may be used to identify sources of multimedia information that may be used in the provision of enhanced caller ID information to a user of the PDA 119 and laptop 117, respectively, for example. In addition, a representative embodiment of the present invention may employ other such databases located on network entities accessible via the gateway 118 of FIGS. 2 and 3, and the router 130 of FIG. 2 such as, for example, access devices that are accessible to the gateway 118 or router 130, a server accessible to the gateway 118 or router 130 via a broadband network, such as the content provider 150 of FIG. 1, for example.

In a representative embodiment of the present invention, network entities such as, for example, the gateway 118, the access device 124, the wireless PDA 119, and the laptop 117 may comprise a second database that may be used to provide enhanced caller ID information to a user. For example, in the illustration of FIG. 3A, the gateway 118 is shown as having a database A 157, the access device 124 comprises a database A 158, the wireless PDA 119 has the database A 159, and the laptop 117 comprises the database A 160. Each of the databases A 157, 158, 159, 160 represent collections of references (e.g., pointers) to and/or content of information items exchanged by their associated network entity during a communication activity. Such communications activities may comprise the exchange of, for example, voice communication, email with and/or without attachments, instant messaging, and the exchange of multimedia information such as streaming video, broadcast video, voice, digital data, text, digitized audio, digitized still images, digitized video, and digitized music. In a representative embodiments of the present invention, the collection of such information and the storage of such information as that of the databases A 157, 158, 159, 160, and 156 may be performed at any of a variety of locations in the communication systems of FIGS. 1 and 2. In addition, the databases A 157, 158, 159, 160 may, for example, contain references (e.g., pointers) to and/or the content of multimedia information items explicitly identified by a user, before, during, or after a call.

In a representative embodiment in accordance with the present invention, the content of the databases A 157, 158, 159, 160 of FIG. 3A, and of databases 152, 153, 156, 157 of FIG. 2, may be collected by analyzing streams of multimedia information as they are exchanged during a communication session or activity. For example, the occurrence and/or contents of email traffic and/or instant messaging, attachments to such messaging, and/or other multimedia information exchanged by the access device 124 of location 1 102 and the access device 126 in communication with the GSM 114 of FIG. 2 during a communication session may be analyzed by the wireless carrier central office 114b to determine the identity of and/or types of information being exchanged. Information items such as, for example, email addresses, URLs, file paths, and telephone directory numbers that may be embedded within messaging, and documents, spreadsheets, slide presentations, software, video and/or audio clips, and a variety of other information items that may be exchanged independently or as attachments, may be identified. Information identifying such items may be collected, associated with information identifying participants in the communication session or activity, and stored in a database such as the databases A 157, 158, 159, 160 of FIG. 3A, and databases 152, 153, 156, 157 of FIG. 2. Information identifying the communication session such as, for example, information identifying the participants (e.g., caller ID information) and the date and time of the communication may be stored along with the information items that are identified during the communication session.

In a representative embodiment of the present invention, the access device 124, or another network entity such as, for example, the gateway 118, router 130, wireless carrier central office 114b, or other entity may access one of the databases A 157, 158, 159, 160 of FIG. 3A and/or databases 152, 153, 156, 157 of FIG. 2, and may provide to the called and/or calling party enhanced called/calling party ID information derived from the information collected in, for example, the databases A 157, 158, 159, 160 of FIG. 3A, and/or the databases 152, 153, 156, 157 of FIG. 2. Such information may, for example, be provided to the calling party before the call is initiated, may be provided to the called party at the time the call is initiated, or may be made available at other times. In a representative embodiment of the present invention. the retrieval of such information may be based upon conventional called/calling party ID information such as, for example, the name of a party to the call, telephone directory numbers, Internet protocol (IP) addresses, electronic serial numbers, media access control (MAC) addresses, International Mobile Station Identifiers (IMSIs), Mobile Identification Numbers (MINs), and International Mobile Equipment Identities (IMEIs), to name just a few.

In a representative embodiment of the present invention, a communication session may comprise a voice call, and the speech content of the voice call may be stored for later access. The storage of call content may result from an automatic behavior of the communication system, or may be manually activated by the user of an access device such as, for example, the access device 124 of FIG. 3A. Further details of a system supporting the automatic or manually initiated storage of voice call content may be found in U.S. patent application Ser. No. 11/093,938, entitled "Extended Call Handling Functionality Using Multi-Network Simulcasting", filed Mar. 30, 2005, the complete subject matter of which is hereby incorporated herein by reference, in its entirety. Information about the existence and whereabouts of such stored call content may be associated with information about the call (e.g., date, time, and identities of call participants), and entered into a database such as, for example, the databases 157, 158, 159, 160 of FIG. 3A and/or the databases 152, 153, 156, 157 of FIG. 2, for later access. The information in the databases may later be accessed using information about the call (e.g., date, time, and/or identities of the call participants), and the stored call content may then be replayed.

In a representative embodiment of the present invention, the contents of an email message or instant messaging message may be analyzed to determine whether any identifiable information items are present, as described above. For example, in one representative embodiment in accordance with the present invention, text that represents an email address, a universal resource locator (URL), a file path, a directory number, and/or any other information items of possible interest may be identified, and made of record in a database such as, for example, the databases 157, 158, 159, 160 of FIG. 3A and/or the databases 152, 153, 156, 157 of FIG. 2. The identified information items may be associated with information about the email (e.g., date, time, and identities of sender and/or recipient(s)). The date and time, email address of the origin and destination, and other details of the email itself may, for example, be associated with the identified information item(s) of interest from the email messaging. This may enable access to such information items using, for example, the information about the email (e.g., date, time, and/or identities of sender and/or recipient(s).)

In yet another representative embodiment of the present invention, multimedia information items attached to, for example, email or instant messaging messages such as, for example, spreadsheet files, documents, audio clips such as MP3 encoded digital audio, digitized images, video clips such as MPEG encoded digital video, executable programs, scripts, and other multimedia attachments may be identified and made of record in a database such as, for example, the databases 157, 158, 159, 160 of FIG. 3A and/or the databases 152, 153, 156, 157 of FIG. 2. The identified attachments may be associated in the database with one or more participants of a communication session, in this instance an exchange of email or instant messaging. The date and time, email address of origin and/or destination address, and other details of the email itself may be associated with the identified attachments to enable later access.

Figure 4:
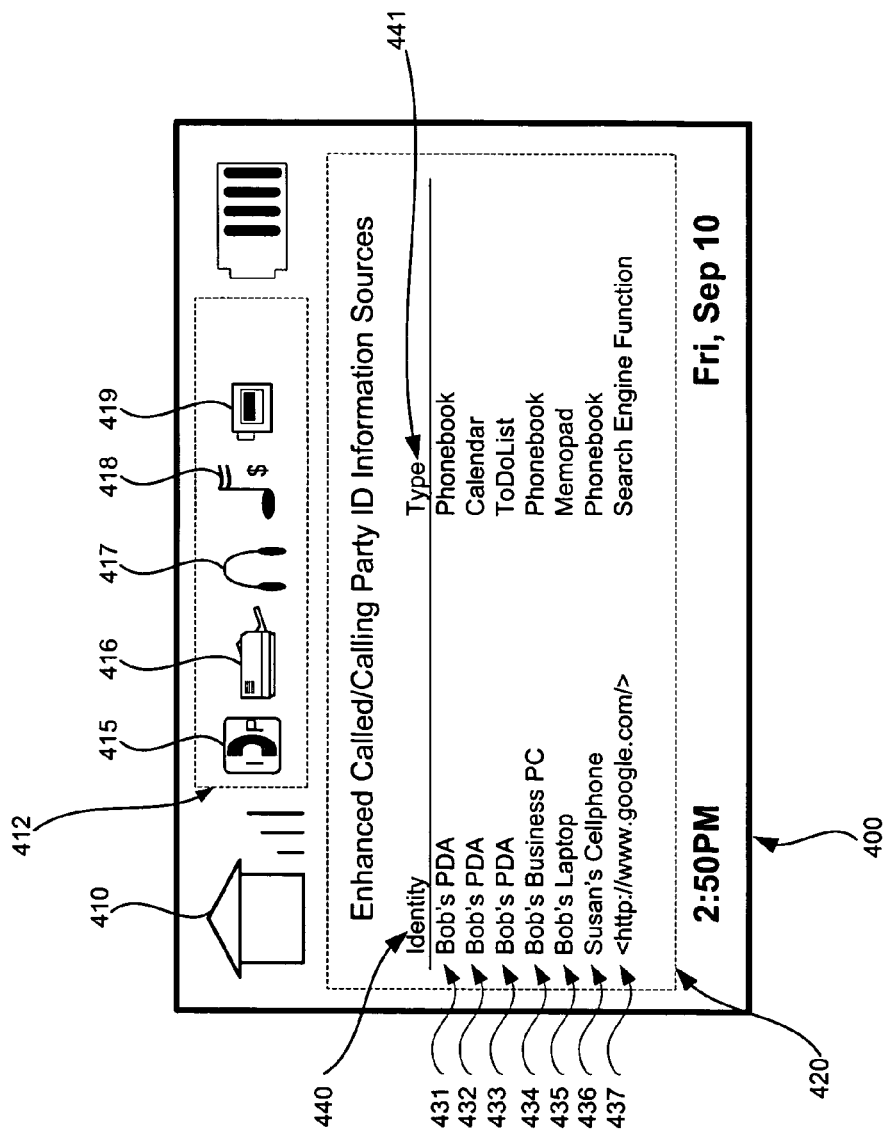
FIG. 4 illustrates a display showing an exemplary information sources screen comprising a collection of information sources accessible to an access device such as, for example, the access device of FIGS. 1, 2 and 3, that may be used in providing enhanced caller identification (ID) in accordance with a representative embodiment of the present invention.

FIG. 4 illustrates a display 400 showing an exemplary information sources screen 420 comprising a collection of information sources accessible to an access device such as, for example, the access device 124 of FIGS. 1, 2 and 3, that may be used in providing enhanced caller identification (ID) in accordance with a representative embodiment of the present invention. The display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, and a video entertainment icon 419, showing those services that may be advertised by a broadband access gateway as being available to an appropriately identified or authorized user of the access device.

In the illustration of FIG. 4, the information sources screen 420 is arranged in a tabular format to show a source identity column 440 and a type column 441, listing the identity and type, respectively, of a number of information sources that may be used in providing enhanced called/calling party identification. Although the illustration of FIG. 4 shows a tabular format of text items, this particular form of presentation does not represent a limitation of the present invention, as other forms of user interface may be employed without departing from the spirit and scope of the present invention. Each of the information source entries 431, 432, 433, 434, 435, 436, 437 of the information sources screen 420 identifies an information source and an associated source type. In a representative embodiment of the present invention, a multimedia information source may comprise an access device such as, for example, the access devices 122, 124, 126, the laptop 117, the wireless PDA 119, the PC 138, the wireless PDA 134, the laptop 136, and the digital video camera 121 of FIG. 2. In a representative embodiment of the present invention, each access device in communication with a broadband access gateway such as, for example, the gateway 118 of FIG. 3 may have multimedia content useful in providing enhanced caller/calling ID information to a user. Identification of the sources and types of multimedia information present on the set of access devices in communication with a broadband access gateway such as, for example, the gateway 118 or the router 130 of FIG. 2, may be performed following the establishment of communication of the access device with the gateway 118. Identification of the sources and types of the multimedia information accessible on an access device may also occur periodically while the access device is in communication with the gateway 118.

The illustration of FIG. 4 shows in information sources entries 431, 432, 433 that "Bob's PDA" contains multimedia information of types "Phonebook", "Calendar", and "ToDoList", respectively. In addition, information source entry 434 shows that "Bob's Business PC" contains multimedia information of type "Phonebook", and information source entry 435 shows that "Bob's Laptop" contains multimedia information of type "Memopad". Information source entry 436 indicates that "Susan's Cellphone" contains multimedia information of type "Phonebook", and information source entry 437 shows that a "Search Engine Function" is available at universal resource locator (URL) "http://www.google.com". As described above with respect to FIG. 3, the multimedia information sources identified in the information sources screen 420 may be identified by a user of an access device such as, for example, the access device 124 of FIG. 3, by a broadband access gateway such as, for example, the gateway 118 of FIG. 3, or a combination of the two.

Figure 4A:
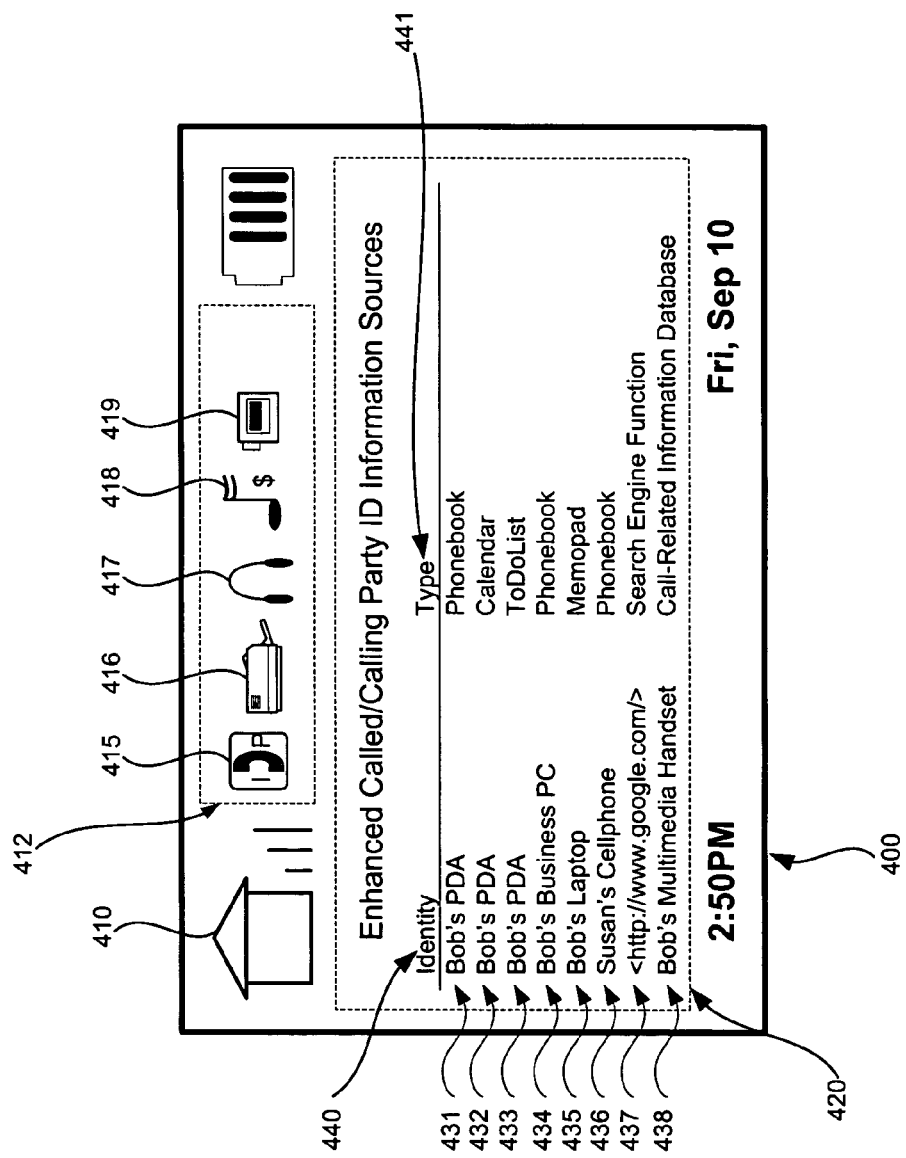
FIG. 4A illustrates a display showing another exemplary information sources screen comprising a collection of information sources accessible to an access device such as, for example, the access device of FIGS. 1, 2 and 3A, that may be employed in providing enhanced caller identification (ID) using information items collected during communication activities, in accordance with a representative embodiment of the present invention.

FIG. 4A illustrates a display 400 showing another exemplary information sources screen 420 comprising a collection of information sources accessible to an access device such as, for example, the access device 124 of FIGS. 1, 2 and 3A, that may be employed in providing enhanced caller identification (ID) using information items collected during communication activities, in accordance with a representative embodiment of the present invention. In the same fashion as the example of FIG. 4, the display 400 of FIG. 4A comprises a network indicator 410, a network services indicator area 412, a battery life indicator, a time of day indicator, and a day and date indicator. The network services indicator area 412 of FIG. 4A comprises an Internet protocol (IP) phone service icon 415, a printer service icon 416, a stereo entertainment icon 417, a pay music service icon 418, and a video entertainment icon 419, showing those services that may be advertised by a broadband access gateway as being available to an appropriately identified or authorized user of the access device.

The information sources screen 420 in the illustration of FIG. 4A is arranged in a tabular format to show a source identity column 440 and a type column 441, listing the identity and type, respectively, of a number of information sources that may be used in providing enhanced called/calling party identification. Although the illustration of FIG. 4A shows a tabular format of text items, this particular form of presentation does not represent a specific limitation of the present invention, as other forms of user interface may be employed without departing from the spirit and scope of the present invention. Each of the information source entries 431, 432, 433, 434, 435, 436, 437, 438 of the information sources screen 420 identifies an information source and an associated source type. In a representative embodiment of the present invention, a multimedia information source may comprise an access device such as, for example, the access devices 122, 124, 126, the laptop 117, the wireless PDA 119, the PC 138, the wireless PDA 134, the laptop 136, and the digital video camera 121 of FIG. 2. In a representative embodiment of the present invention, each access device in communication with a broadband access gateway such as, for example, the gateway 118 of FIG. 3 may have multimedia content useful in providing enhanced caller/calling ID information to a user. Identification of the sources and types of multimedia information present on the set of access devices in communication with a broadband access gateway such as, for example, the gateway 118 or the router 130 of FIG. 2, may be performed following the establishment of communication of the access device with the gateway 118. Identification of the sources and types of the multimedia information accessible on an access device may also occur periodically while the access device is in communication with the gateway 118.

In the illustration of FIG. 4A, the information source entries 431, 432, 433, 434, 435, 436, 437 may correspond to, for example, the information sources entries 431, 432, 433, 434, 435, 436, 437 that are described above with respect to FIG. 4. The illustration of FIG. 4A, however, comprises an additional information source entry 438 that may represent, for example, the database A 158 of access device 124 of FIG. 3A. Accordingly, the information source represented by the information source entry 438 may comprise a collection of information items gleaned from prior communications activities of this user of the access device 124, for example. As described above with respect to FIG. 3A, the multimedia information sources identified in the information sources screen 420 may be identified by a user of an access device such as, for example, the access device 124 of FIG. 3A, by a broadband access gateway such as, for example, the gateway 118 of FIG. 3A, or a combination of the two.

Figure 5:
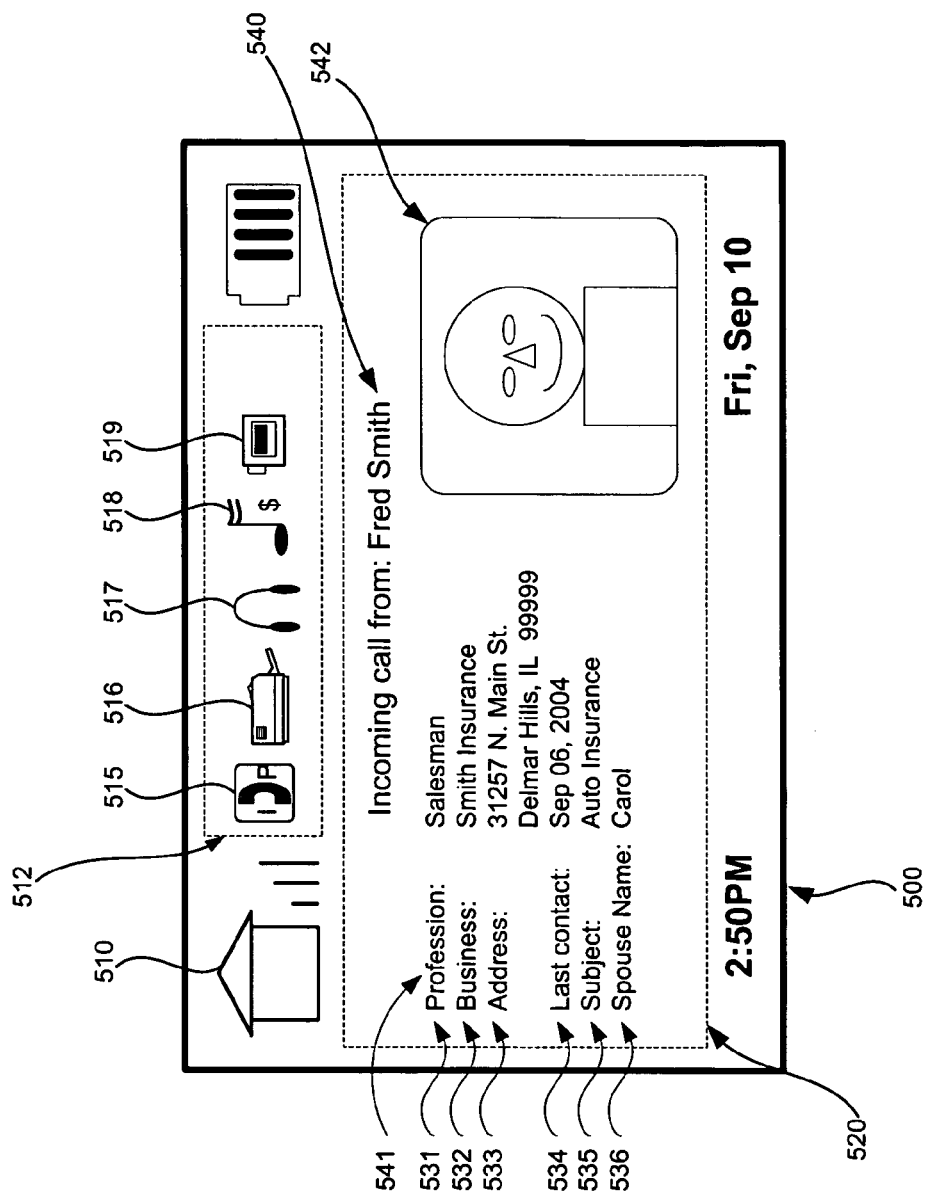
FIG. 5 illustrates a display showing an exemplary enhanced caller identification (caller ID) information screen illustrating just a few of the many information items that may be provided to the user of an access device such as, for example, the access device of FIGS. 1, 2 and 3, served by a broadband access gateway having enhanced caller identification (ID) capabilities in accordance with a representative embodiment of the present invention.

FIG. 5 illustrates a display 500 showing an exemplary enhanced caller identification (caller ID) information screen 520 illustrating just a few of the many information items that may be provided to the user of an access device such as, for example, the access device 124 of FIGS. 1, 2 and 3, served by a broadband access gateway having enhanced caller identification (ID) capabilities in accordance with a representative embodiment of the present invention. The display 500 of FIG. 5 comprises a network indicator 510, a network services indicator area 512, a battery life indicator, a time of day indicator, and a day and date indicator. The network services indicator area 512 comprises an Internet protocol (IP) phone service icon 515, a printer service icon 516, a stereo entertainment icon 517, a pay music service icon 518, and a video entertainment icon 519, showing those services that may be advertised by a broadband access gateway as being available to an appropriately identified or authorized user of the access device. Although the illustration of FIG. 5 shows a particular arrangement and assortment of items, this particular form of presentation does not represent a specific limitation of the present invention, as other forms of user interface may be employed without departing from the spirit and scope of the present invention.

The enhanced caller identification (caller ID) information screen 520 of FIG. 5 may present additional information related to the calling party, to the user of an access device such as, for example, the access device 124 of FIG. 3. The enhanced caller ID information screen 520 comprises a caller name entry 540, a "Profession" entry 541, a "Business" entry 532, an "Address" entry 532, a "Last Contact" entry 534, a "Subject" entry 535, and a "Spouse Name" entry 536. The enhanced caller identification (caller ID) information screen 520 also comprises an image 542 of the calling party. A representative embodiment of the present invention may retrieve information such as that shown in the caller name entry 540, "Profession" entry 541, "Business" entry 532, "Address" entry 532, "Last Contact" entry 534, "Subject" entry 535, and "Spouse Name" entry 536 from one or more multimedia information sources such as, for example, the those identified in the source identity column 440 of the information sources screen 420 of FIG. 4.

In a representative embodiment of the present invention, the enhanced calling/called party identification (ID) information provided to the called/calling party may be retrieved not only from the access devices such as, for example, the access device 124, the laptop 117, and the wireless PDA 119 that are accessible to a broadband access gateway such as, for example, the gateway 118 of FIG. 3, but also from those information sources accessible to the gateway 118 via, for example, a broadband connection such as the broadband connection 107 of FIGS. 1, 2, and 3. This aspect of an embodiment of the present invention may permit identification and retrieval of multimedia information resident anywhere on a network such as, for example, the Internet 140 of FIG. 1. For example, in a representative embodiment of the present invention, the gateway 118 may retrieve a picture of the calling party, names of the callings party's family members, a home address, place of employment and professional position, church affiliation, personal interest or hobbies, the last date of contact, details of a business relationship, recent news clips about the caller, and numerous other items, from the large number of information sources outside of the set of access devices that are accessible to the gateway 118 such as, for example, those described above with regard to FIGS. 1, 2, and 3.

In an embodiment of the present invention, a broadband access gateway such as, for example, the gateway 118 of FIG. 3 may parse the identified multimedia information from an information source, to identify and associate a type with various information items. Examples of such information items include telephone directory numbers, residence and business addresses, website universal resource locators (URLs), email addresses, familial relationships (e.g., wife, husband, son, daughter, brother, etc.), and professional designations (e.g., MD, DDS, OD, Esq., and the like), to name just a few. The selection of which of the identified types are to be forwarded and displayed to the called party may be specified by the user of the access device receiving the call, and there may be a default set of types of information items that may be displayed.

Figure 5A:
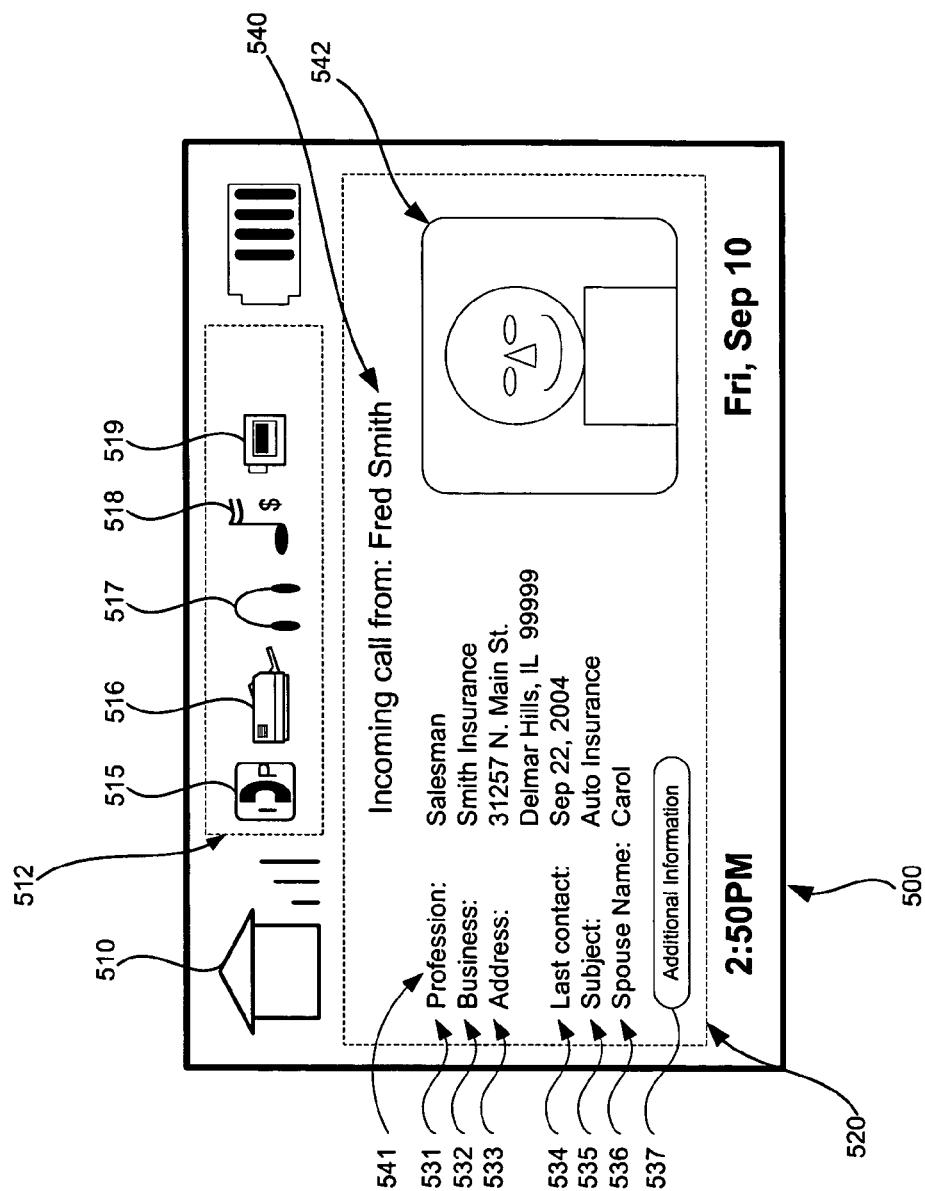
FIG. 5A illustrates a display showing another exemplary enhanced caller identification (caller ID) information screen similar to the enhanced caller ID information screen of FIG. 5, comprising a soft button that provides a means of accessing call-related information items collected from prior communications activities of a user of an access device such as, for example, the access device of FIGS. 1, 2 and 3A, in accordance with a representative embodiment of the present invention.

FIG. 5A illustrates a display 500 showing another exemplary enhanced caller identification (caller ID) information screen 520 similar to the enhanced caller ID information screen 520 of FIG. 5, comprising a soft button 537 that provides a means of accessing call-related information items collected from prior communications activities of a user of an access device such as, for example, the access device 124 of FIGS. 1, 2 and 3A, in accordance with a representative embodiment of the present invention. Similar to the display 500 of FIG. 5, the display 500 of FIG. 5A comprises a network indicator 510, a network services indicator area 512, a battery life indicator, a time of day indicator, and a day and date indicator. The network services indicator area 512 comprises an Internet protocol (IP) phone service icon 515, a printer service icon 516, a stereo entertainment icon 517, a pay music service icon 518, and a video entertainment icon 519, showing those services that may be advertised by a broadband access gateway as being available to an appropriately identified or authorized user of the access device.

Like the enhanced caller ID information screen 520 of FIG. 5, the enhanced caller ID information screen 520 of FIG. 5A comprises a caller name entry 540, a "Profession" entry 541, a "Business" entry 532, an "Address" entry 532, a "Last Contact" entry 534, a "Subject" entry 535, and a "Spouse Name" entry 536. The enhanced caller identification (caller ID) information screen 520 also comprises an image 542 of the calling party. A representative embodiment of the present invention may retrieve information such as that shown in the caller name entry 540, "Profession" entry 541, "Business" entry 532, "Address" entry 532, "Last Contact" entry 534, "Subject" entry 535, and "Spouse Name" entry 536 from one or more multimedia information sources such as, for example, those identified in the source identity column 440 of the information sources screen 420 of FIG. 4A. In addition to the functionality of the enhanced caller ID information screen 520 of FIG. 5, however, in one representative embodiment of the present invention, the enhanced caller ID information screen 520 of FIG. 5A may include a soft button 537 that provides user access to additional call-related information items that may be collected during previous communications sessions or activities, and stored in a database such as the databases A 157, 158, 159, 160 of FIG. 3A, and databases 152, 153, 156, 157 of FIG. 2, for example. In various representative embodiments of the present invention, the items of information displayed in the enhanced caller ID information screen 520 of FIG. 5A may be presented to calling party and/or the called party at, during, or after initiation of a call session, for example. The selection of information items from the databases A 157, 158, 159, 160 that are made available to the called and/or calling parties may, for example, be determined in accordance with filters (e.g., parameters) defined by the calling or called party. Although the illustration of FIG. 5A shows a particular arrangement and assortment of items, this particular form of presentation does not represent a specific limitation of the present invention, as other forms of user interface may be employed without departing from the spirit and scope of the present invention.

Figure 5B:
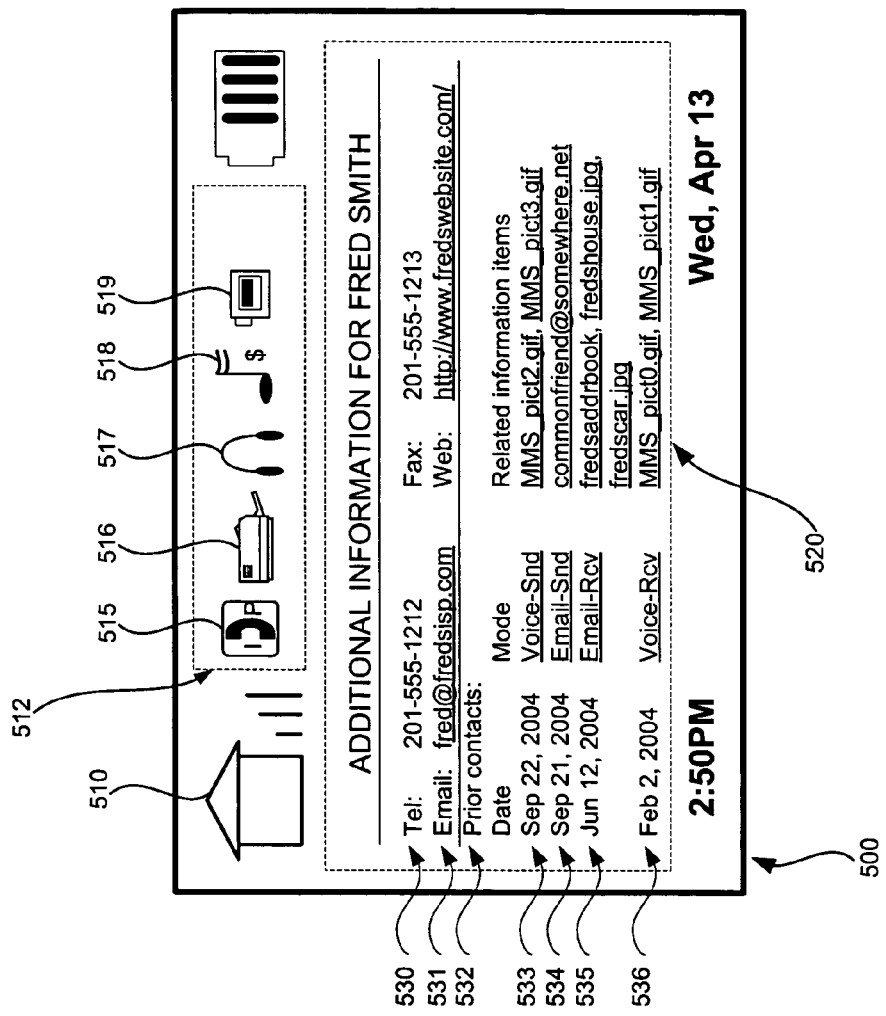
FIG. 5B illustrates a display showing an additional information screen comprising information items collected from prior communications activities between a user of an access device such as, for example, the access device and another party, that may be displayed upon activation of the soft button of FIG. 5A, in accordance with a representative embodiment of the present invention.

FIG. 5B illustrates a display 500 showing an additional information screen 520 comprising information items collected from prior communications activities between a user of an access device such as, for example, the access device 124 and another party, that may be displayed upon activation of the soft button 537 of FIG. 5A, in accordance with a representative embodiment of the present invention. The display 500 of FIG. 5B comprises a network indicator 510, a network services indicator area 512, a battery life indicator, a time of day indicator, and a day and date indicator. The network services indicator area 512 comprises an Internet protocol (IP) phone service icon 515, a printer service icon 516, a stereo entertainment icon 517, a pay music service icon 518, and a video entertainment icon 519, showing those services that may be advertised by a broadband access gateway as being available to an appropriately identified or authorized user of the access device.

The information items displayed on the additional information screen 520 may be retrieved from a database such as, for example, the databases A 157, 158, 159, 160 of FIG. 3A and/or the databases 152, 153, 156, 157 of FIG. 2, based upon information identifying participant(s) in a communication activity such as a voice call, for example, and may be the same identifying information used to retrieve the caller name entry 540, the "Profession" entry 541, the "Business" entry 532, the "Address" entry 532, the "Last Contact" entry 534, the "Subject" entry 535, the "Spouse Name" entry 536, etc., of the enhanced caller ID information screen 520 of FIG. 5A. The selection of information items from the databases A 157, 158, 159, 160 that are made available to the called and/or calling parties and displayable in the additional information screen 520 may, for example, be determined in accordance with filters (e.g., parameters) defined by the calling or called party. Although the illustration of FIG. 5B shows a tabular format of text items, this particular form of presentation does not represent a specific limitation of the present invention, as other forms of user interface may be employed without departing from the spirit and scope of the present invention.

The additional information screen 520 of FIG. 5B comprises a first entry 530 listing the voice telephone directory number "201-555-1212" and facsimile telephone directory number "201-555-1213" for call participant "Fred Smith". The second entry 531 shows the email address "fred@fredsisp.com", and the URL "http://www.fredswebsite.com/" of the web site belonging to "Fred Smith". The additional information screen 520 also comprises a listing of prior contacts 532, comprising a number of entries, each having a "Date" field, a "Mode" field, and a "Related Information Items" field. The listing of prior contacts 532 shows an entry 533 for a voice call to "Fred Smith" on Sep. 22, 2004, an entry 534 for an email sent to "Fred Smith" on Sep. 21, 2004, an entry 535 for an email received from "Fred Smith" on Jun. 12, 2004, and an entry 536 for a voice call received from "Fred Smith" on Feb. 2, 2004. Each of the entries represents a communication session or activity involving the user of the access device 124, and "Fred Smith".

As shown in the illustration of FIG. 5B, the entry 533 includes related information items indicating that an exchange of the image files "MMS_pict2.gif" and "MMS_pict3.gif" was identified and recorded in a database such as, for example, the database A 157 of FIG. 3A, during the communication session of Sep. 22, 2004. The analysis that detected/identified the exchange may have been performed, for example, by the access device 124, or by another entity in a communication system such as that shown in FIGS. 1 and 2. The Mode field of entry 533 ("Voice_Snd") and the image file names "MMS_pict2.gif" and "MMS_pict3.gif" are underlined, to indicate to the user of the access device 124 that stored content of the voice call and the image files "MMS_pict2.gif" and "MMS_pict3.gif" may be accessed by selecting those items using whatever selection means is provided on the access device 124.

In the example of FIG. 5B, the entry 534 includes a related information item that indicates that an email sent to "Fred Smith" on Sep. 21, 2004 contained the email address "commonfriend@somewhere.net". This email address was identified and recorded in a database such as, for example, the database A 157 of FIG. 3A. The analysis that detected/identified the email address may have been performed, for example, by the access device 124, or by another entity in a communication system such as that shown in FIGS. 1 and 2. The Mode field of entry 534 ("Email-Snd") and the email address are underlined, to indicate to the user of the access device 124 that a copy of the email that was sent may be accessed using whatever selection means is provided on the access device 124, and that the email address in entry 534 may be selected to originate an email to "commonfriend@somewhere.net".

The entry 535 in the example of FIG. 5B illustrates a related information item that indicates that an email received from "Fred Smith" on Jun. 12, 2004 had the address book file "fredsaddressbook", and JPEG image files "fredshouse.jpg" and "fredscar.jpg" attached. The attachments to the email were identified and recorded in a database such as, for example, the database A 157 of FIG. 3A. The analysis that detected/identified the attachments may have been performed, for example, by the access device 124, or by another entity in a communication system such as that shown in FIGS. 1 and 2. The Mode field of entry 535 ("Email-Rcv") and the attachment names are underlined, to indicate to the user of the access device 124 that a copy of the email that was received may be accessed, and that the images encoded within the image files "fredshouse.jpg" and "fredscar.jpg" may be viewed, by selecting those items using whatever selection means is provided on the access device 124.

The entry 536 of FIG. 5B illustrates another example, in which a voice call was received from "Fred Smith" on Feb. 2, 2004, by the user of an access device such as, for example, the access device 124 of FIG. 3A. The "Related Information Items" field of entry 536 indicates the during the voice call, two GIF images "MMS_pict0.gif" and MMS_pict1.gif" were exchanged. The exchange of the GIF images may have been identified and recorded, during the communication session represented by entry 536, in a database such as, for example, the database A 157 of FIG. 3A. The analysis that detected/identified the exchanged images may have been performed, for example, by the access device 124, or by another entity in a communication system such as that shown in FIGS. 1 and 2. The Mode field of entry 535 ("Voice-Rcv") and the image file names are underlined, to indicate to the user of the access device 124 that stored content of the voice call may be accessed, and that the images encoded within the image files "MMS_pict0.gif" and "MMS_pict1.gif" may be viewed, by selecting those items using whatever selection means is provided on the access device 124.

The above examples illustrate that a communication system employing a representative embodiment of the present invention may permit a user to easily access items of information that were previously exchanged or made reference to, while electronically communicating with others.

Although the example of FIGS. 5A and 5B employ a soft button 537 on enhanced caller ID information screen 520 to access the additional information screen 520 of FIG. 5B, it should be clear that the information of additional information screen 520 of FIG. 5B may also be automatically displayed as part of an enhanced caller ID information screen such as the enhanced caller ID information screen 520 of FIG. 5A, and that other representations of the information presented in FIGS. 5A and 5B may be employed, without departing from the spirit and scope of the present invention. In addition, in a representative embodiment of the present invention, information items such as those displayed in FIGS. 5A, 5B may be shared by one party with other parties to a call, either at the time the call is initiated, during the call, and/or following the call, without departing from spirit and scope of the present invention.

Figure 5C:
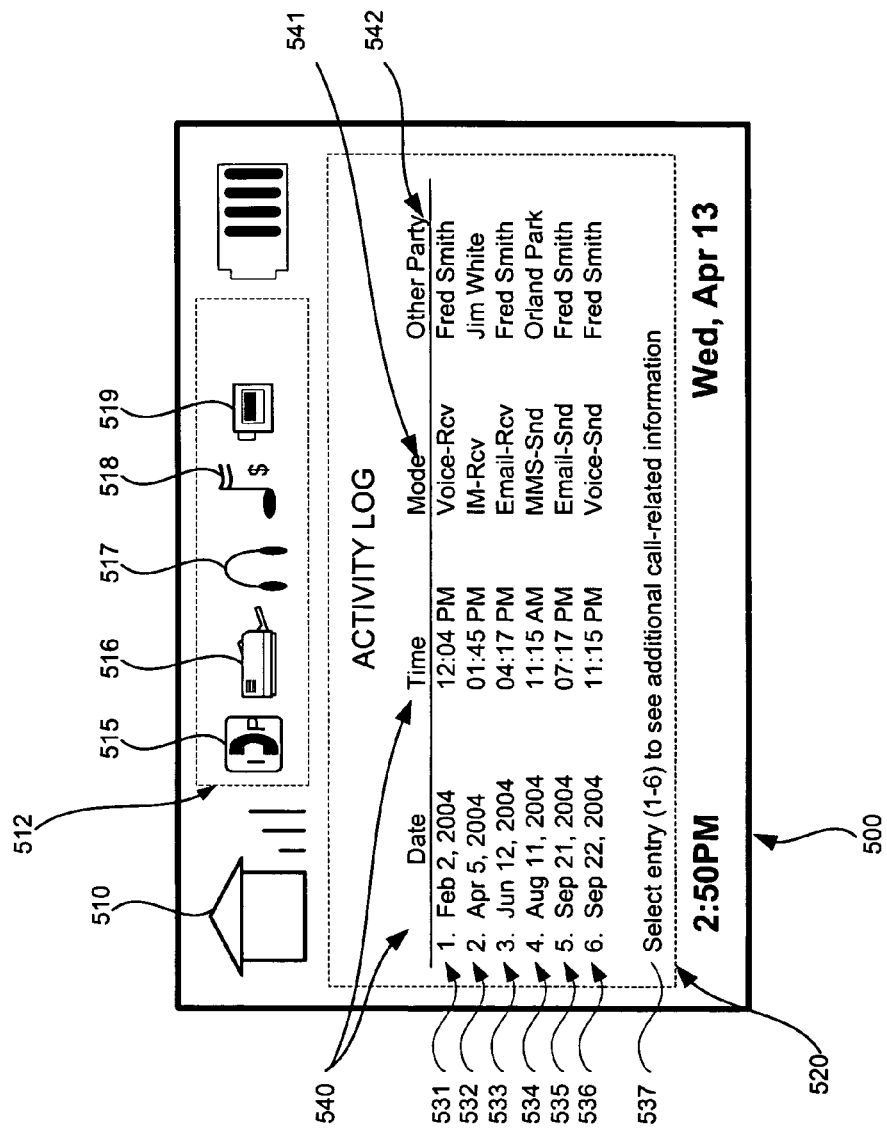
FIG. 5C illustrates a display showing an exemplary activity log screen comprising a listing of communication sessions for a user of an access device such as, for example, the access device of FIGS. 1, 2 and 3A, in a communication system supporting collection of enhanced caller identification (ID) information, in accordance with a representative embodiment of the present invention.

FIG. 5C illustrates a display 500 showing an exemplary activity log screen 520 comprising a listing of communication sessions for a user of an access device such as, for example, the access device 124 of FIGS. 1, 2 and 3A, in a communication system supporting collection of enhanced caller identification (ID) information, in accordance with a representative embodiment of the present invention. The display 500 as shown in FIG. 5C comprises a network indicator 510, a network services indicator area 512, a battery life indicator, a time of day indicator, and a day and date indicator. The network services indicator area 512 of FIG. 5C comprises an Internet protocol (IP) phone service icon 515, a printer service icon 516, a stereo entertainment icon 517, a pay music service icon 518, and a video entertainment icon 519, showing those services that may be available to an appropriately identified or authorized user of the access device. The display 500 also comprises a display area 520 comprising an activity log screen showing communication activities of the access device 124.

In the illustration of FIG. 5C, the activity log screen 520 is displayed as text arranged in a tabular format to show details of communication activities or sessions of an access device such as, for example, the access device 124 of FIG. 3A, although other forms of presentation may be used without departing from the spirit and scope of the present inventon. The activity log screen 520 comprises log entries 531, 532, 533, 534, 535, 536 representing individual communications activities or sessions, each of the activities/sessions having a date and time 540, a mode 541, and identifier(s) of other parties 542 of the communication activity. In the example of FIG. 5C, four different modes of communication are shown: voice, instant messaging (IM), email, and multimedia messaging service (MMS). For example, the first log entry 531 shows an exemplary entry for a voice call received on Feb. 2, 2004 at 12:04 PM from "Fred Smith", while the second log entry 532 shows details of an instant message (IM) received on Apr. 5, 2004 at 1:45 PM from "Jim White". The third log entry 533 illustrates an email message that was received on Jun. 12, 2004 at 4:17 PM from "Fred Smith", and the fourth log entry 534 shows information about a multimedia messaging service communication sent on Aug. 11, 2004 at 11:15 AM to "Orland Park". The fifth log entry 535 represents an email message sent to "Fred Smith" at 7:17 PM on Sep. 21, 2004, and the sixth log entry 536 records a voice call placed to "Fred Smith" at 11:15 PM on Sep. 22, 2004. Instruction 537 prompts the user to select one of log entries 531, 532, 533, 534, 535, 536 so that the user may review additional information related to the listed communication activities. User selection of one of the log entries 531, 532, 533, 534, 535, 536 may result in the display of information such as that shown in the illustration of FIG. 5B, for example. A user may employ the activity log screen 520 to review past communication activities when not actively engaged in communication, or during a communication session, in order to access information items that may have been exchanged during communications activities or sessions not involving the other parties to the current call/exchange. Although the activity log screen 520 is presented in FIG. 5C in a particular format comprising certain fields and entries, the format of FIG. 5C is for illustrative purposes only, and does not represent specific limitations of the present invention. A variety of other forms of user presentation (e.g., a visual, icon-based, graphical interface) may be employed without departing from the spirit and scope of the present invention.

Figure 6:
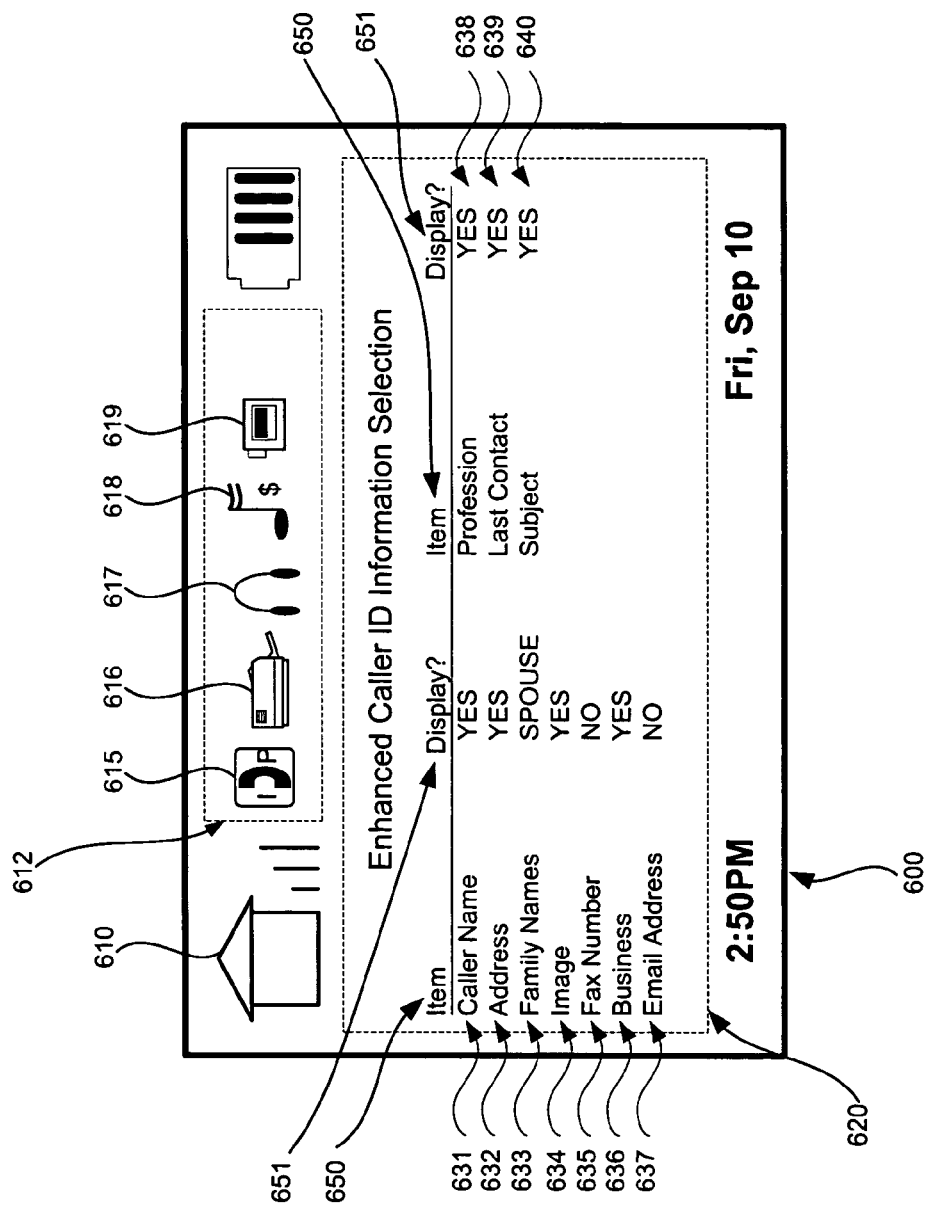
FIG. 6 illustrates an exemplary enhanced caller ID information selection screen, in accordance with a representative embodiment of the present invention.

FIG. 6 illustrates an exemplary enhanced caller ID information selection screen 620, in accordance with a representative embodiment of the present invention. The display 600 of FIG. 6 comprises a network indicator 610, a network services indicator area 612, a battery life indicator, a time of day indicator, and a day and date indicator. The network services indicator area 612 comprises an Internet protocol (IP) phone service icon 615, a printer service icon 616, a stereo entertainment icon 617, a pay music service icon 618, and a video entertainment icon 619, showing those services that may be advertised by a broadband access gateway as being available to an appropriately identified or authorized user of the access device. The display 600 of FIG. 6 also comprises an enhanced caller ID information selection screen 620 that permits a user of an access device such as, for example, the access device 124 of FIG. 3 to select the items of additional information about a caller that are to be displayed to the called party. The selected additional or enhanced caller ID information items may be displayed in a screen such as, for example, the enhanced caller identification (caller ID) information screen 520 of FIG. 5, described above.

The enhanced caller ID information selection screen 620 shown in FIG. 6 is organized in a tabular format, although other arrangements may be employed without departing from the spirit and scope of the present invention. As shown, the enhanced caller ID information selection screen 620 comprises information item identifier column 650 and display control column 651. As shown in FIG. 6, the enhanced caller ID information selection screen 620 comprises a "Caller Name" item 631, an "Address" item 632, a "Family Names" item 633, an "Image" item 634, a "Fax Number" item 635, a "Business" item 636, an "Email Address" item 637, a "Profession" item 638, and a "Last Contact" item 639, and a "Subject" item 640. A representative embodiment of the present invention may retrieve information from a number of multimedia information sources, as described above, and may select to display only those identifiable pieces of information for which the corresponding item entry in the display column 641 of FIG. 6 is set to "YES". In FIG. 6, the items to be displayed include the "Caller Name" item 631, "Address" item 632, "Image" item 634, "Profession" item 638, "Last Contact" 639, and "Subject" item 640. The "Family Names" item 633 in FIG. 6 has been set to indicate that only the spouse name for the calling party is to be displayed. The selected items shown in FIG. 6 may correspond, for example, to the set of selected items shown in the enhanced caller identification (caller ID) information screen 520 of FIG. 5.

In one representative embodiment of the present invention, the state or value of each of the user-defined selection items or parameters of the enhanced caller ID information selection screen 620 such as, for example, the "YES" associated with the "Caller Name" item 631, the "SPOUSE" associated with the "Family Names" item 633, and the "NO" associated with the "Fax Number" item 635 may be stored in a broadband access gateway such as, for example, the gateway 118 or the router 130 of FIG. 2. In another representative embodiment, the user-defined selection items or parameters may be stored within an access device such as, for example, the access device 124, the wireless PDA 119, and the laptop 117 of FIGS. 1, 2, and 3, and may be sent to the gateway 118 for use in selecting the enhanced calling/called party information. In yet another representative embodiment according to the present invention, the access device may employ one or more of the user-defined selection items or parameters in performing selection of enhanced calling/called party information for delivery to a user. The illustration of FIG. 6 is for the purpose of explanation, and does not represent specific limitations of the present invention, as other forms of presentation may be employed.

Figure 6A:
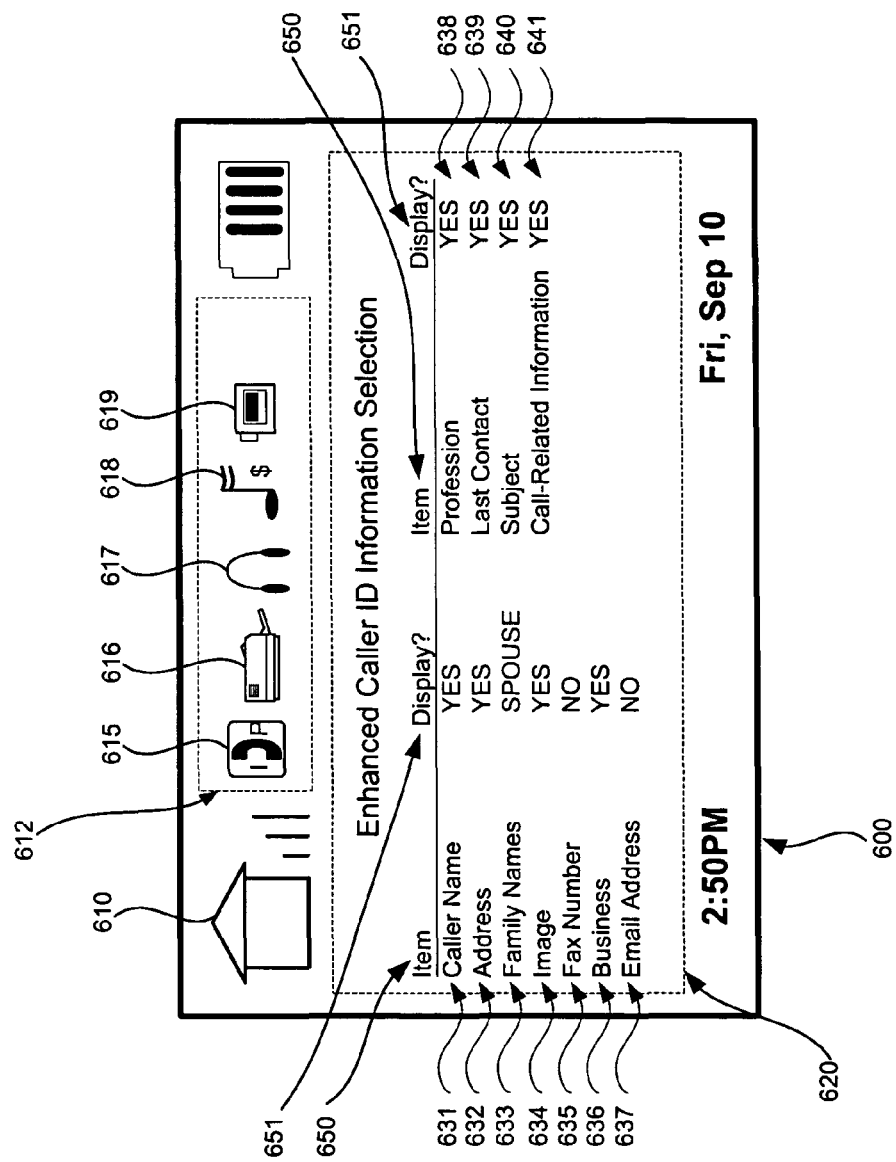
FIG. 6A illustrates an exemplary enhanced caller ID information selection screen, in accordance with a representative embodiment of the present invention.

FIG. 6A illustrates an exemplary enhanced caller ID information selection screen 620, in accordance with a representative embodiment of the present invention. Similar to the illustration of FIG. 6, the display 600 of FIG. 6A comprises a network indicator 610, a network services indicator area 612, a battery life indicator, a time of day indicator, and a day and date indicator. The network services indicator area 612 comprises an Internet protocol (IP) phone service icon 615, a printer service icon 616, a stereo entertainment icon 617, a pay music service icon 618, and a video entertainment icon 619, showing those services that may be advertised by a broadband access gateway as being available to an appropriately identified or authorized user of the access device. The display 600 of FIG. 6A also comprises an enhanced caller ID information selection screen 620 that permits a user of an access device such as, for example, the access device 124 of FIG. 3A to select the items of additional information about a caller that are to be displayed to the called party. The selected additional or enhanced caller ID information items may, for example, be displayed in a screen such as the enhanced caller identification (caller ID) information screen 520 of FIG. 5A, described above. A screen similar to that shown as the enhanced caller ID information selection screen 620 of FIG. 6A may, for example, be employed in setting filters (e.g., parameters) used to select items of multimedia information to be shared with other parties to a call session, either at the time the call is initiated, during, or after the call ends.

The enhanced caller ID information selection screen 620 shown in FIG. 6A is organized in a tabular format, although other arrangements may be employed without departing from the spirit of the present invention. As shown, the enhanced caller ID information selection screen 620 comprises information item identifier column 650 and display control column 651. As shown in FIG. 6A, the enhanced caller ID information selection screen 620 comprises a "Caller Name" item 631, an "Address" item 632, a "Family Names" item 633, an "Image" item 634, a "Fax Number" item 635, a "Business" item 636, an "Email Address" item 637, a "Profession" item 638, and a "Last Contact" item 639, and a "Subject" item 640. A representative embodiment of the present invention may retrieve information from a number of multimedia information sources, as described above, and may select to display only those identifiable pieces of information for which the corresponding item entry in the display column 641 of FIG. 6A is set to "YES". In FIG. 6A, the items to be displayed include the "Caller Name" item 631, "Address" item 632, "Image" item 634, "Profession" item 638, "Last Contact" 639, and "Subject" item 640. The "Family Names" item 633 in FIG. 6A has been set to indicate that only the spouse name for the calling party is to be displayed. Also shown in the illustration of FIG. 6A is a "Call-Related Information" item 641, which has been set for display (i.e., "Yes"). The setting of the "Display" field of the "Call-Related Information" item 641 to "YES" may result, for example, in the display of the soft button 537 in FIG. 5A, or the automatic display of the enhanced caller ID information shown in FIG. 5B, for example. The selected items shown in FIG. 6A may correspond, for example, to the set of selected items shown in the enhanced caller identification (caller ID) information screen 520 of FIG. 5A.

In one representative embodiment of the present invention, the state or value of each of the user-defined selection items or parameters of the enhanced caller ID information selection screen 620 such as, for example, the "YES" associated with the "Caller Name" item 631, the "SPOUSE" associated with the "Family Names" item 633, and the "NO" associated with the "Fax Number" item 635 may be stored in a broadband access gateway such as, for example, the gateway 118 or the router 130 of FIG. 2. In another representative embodiment, the user-defined selection items or parameters may be stored within an access device such as, for example, the access device 124, the wireless PDA 119, and the laptop 117 of FIGS. 1, 2, and 3A, and may be sent to the gateway 118 for use in selecting the enhanced calling/called party information. In yet another representative embodiment according to the present invention, the access device may employ one or more of the user-defined selection items or parameters in performing selection of enhanced calling/called party information for delivery to a user.

Figure 7:
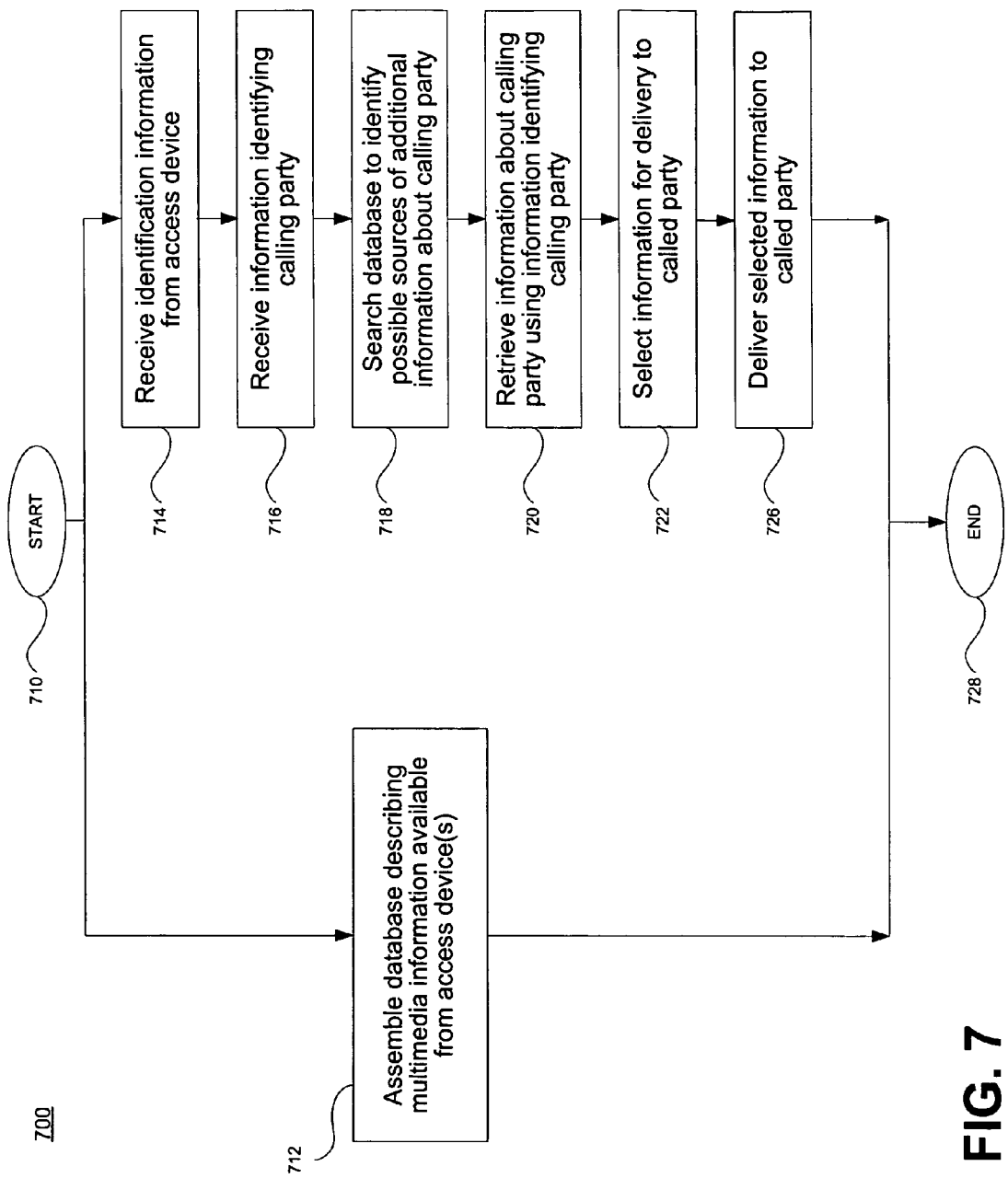
FIG. 7 shows a flowchart illustrating an exemplary method supporting the delivery of enhanced caller identification (ID) information using a broadband access gateway that may correspond, for example, to the gateway of FIG. 2, in accordance with a representative embodiment of the present invention.

FIG. 7 shows a flowchart 700 illustrating an exemplary method supporting the delivery of enhanced caller identification (ID) information using a broadband access gateway that may correspond, for example, to the gateway 118 of FIG. 2, in accordance with a representative embodiment of the present invention. The method of FIG. 7 begins when a gateway such as, for example, the gateway 118 or router 130 of FIG. 2 is powered up (block 710). The method of FIG. 7 is arranged in two paths, to represent that the events in the left path and right path may occur concurrently. In the activity of the left path, the gateway 118 may assemble a database describing multimedia information available from any access devices in communication with the gateway 118 (block 712). Although, for reasons of clarity, this is shown as an activity that is performed once in the method, the collection and assembly of the database may be an ongoing activity. Such an activity may add to the database when an access device enters into communication with a broadband access gateway such as, for example, the gateway 118, remove information when an access device is no longer present within the coverage area of the gateway 118, and may periodically update the database while an access device is within the coverage area of the gateway 118. The left path of the method of FIG. 7 then ends (block 728).

Referring now to the right path of FIG. 7, a broadband access gateway may receive identification information from an access device such as, for example, the access device 124, the wireless PDA 119, or the laptop 117 of FIG. 3. This may occur, for example, when the access device enters the coverage area of a broadband access gateway such as, for example, the gateway 118, or periodically while the access device is within the coverage area. At some later time, the gateway 118 may receive information identifying a calling party of a call received by the identified access device (block 716). The information identifying the calling party may comprise, for example, a directory number, an electronic serial number, an Internet protocol (IP) address, a media access control (MAC) address, an International Mobile Station Identifier (IMSI) address, and a Mobile Identification Number (MIN) address. Following receipt of the information identifying the calling party, the gateway 118 may search the database assembled by the activity of the left path, to identify possible sources of additional information related to the calling party (block 718). Next, the gateway 118 may retrieve information about the calling party from the identified sources using the information identifying the calling party (block 720). The gateway 118 may then select from the retrieved information those pieces of information desired by the called party (block 722). This may employ a set of information selection parameters such as, for example, those discussed above with regard to FIG. 6. The gateway may then deliver the selected information to the access device of the called party for display (block 726). The right path of the method of FIG. 7 then ends (block 728).

Figure 7A:
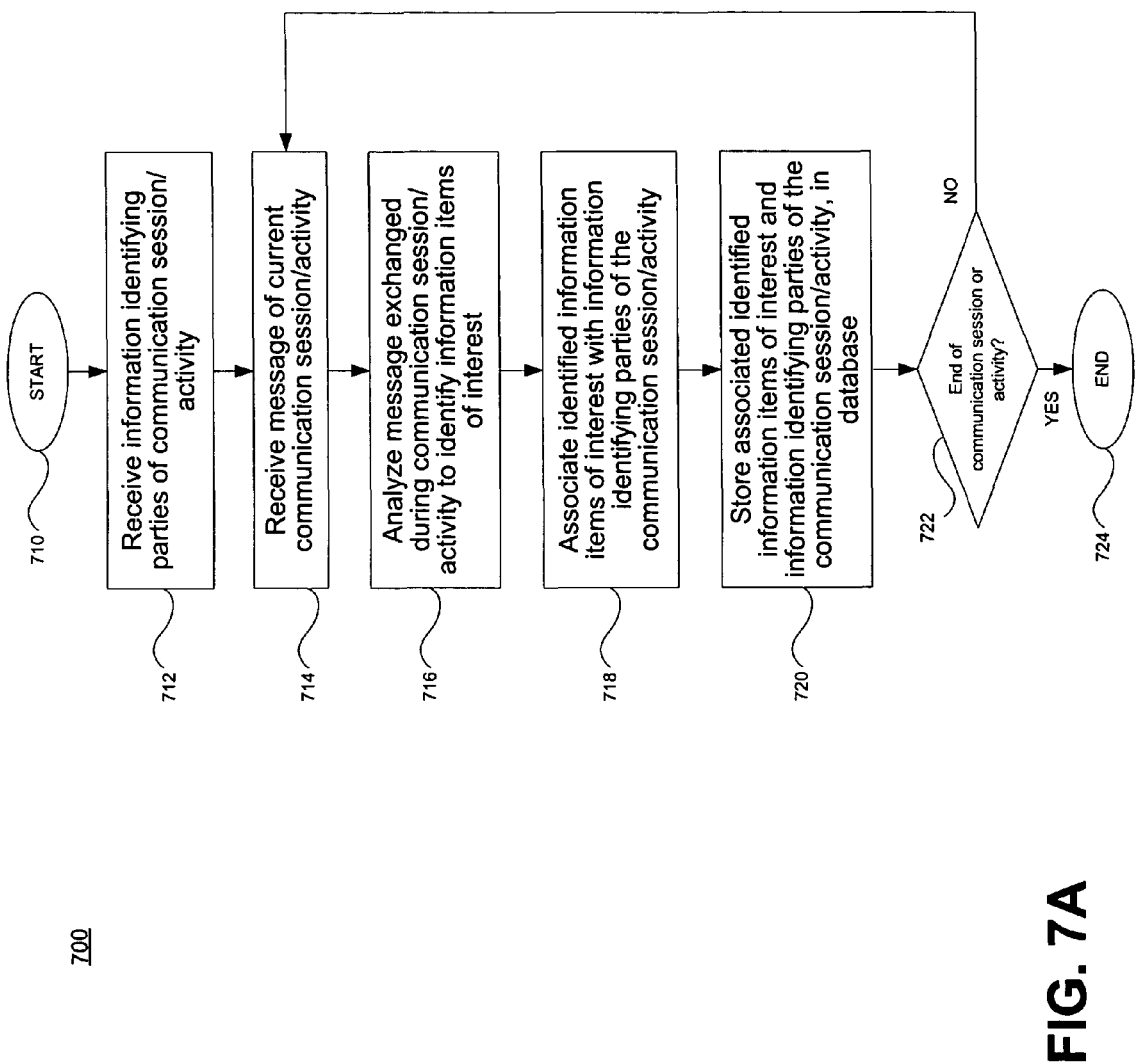
FIG. 7A shows a flowchart illustrating an exemplary method supporting the collection of enhanced caller identification (ID) information, in accordance with a representative embodiment of the present invention.

FIG. 7A shows a flowchart 700 illustrating an exemplary method supporting the collection of enhanced caller identification (ID) information, in accordance with a representative embodiment of the present invention. The method of FIG. 7A begins at the start of a communication session or activity involving, for example, an access device, a gateway, or a wireless carrier central office such as the access device 124 or the gateway 118 of FIG. 3A, or the wireless carrier central office 114b of FIG. 2 (Block 710). Sometime after the start of the communication session or activity, the access device 124, the gateway 118, and/or the wireless carrier central office 114b may receive information identifying the parties of the communication session or activity (block 712). This information may comprise conventional caller ID information such as, for example, the directory number and/or name of the called and/or calling party, or it may comprise electronic serial number(s), Internet protocol (IP) address(es), media access control (MAC) address(es), International Mobile Station Identifier (IMSI) address(es), Mobile Identification Number (MIN) address(es), and International Mobile Equipment Identity (IMEI) address(es), to name only a few such identifiers. The access device 124, the gateway 118, and/or the wireless carrier central office 114b, for example, may then receive a message of the current communication session or activity from any of the participants (block 714), and may analyze the message exchanged during the communication session or activity, to identify information items of interest (block 716). Information items of interest may include, for example, email addresses, URLs, file paths, and telephone directory numbers that may be embedded within the messaging, and documents, spreadsheets, slide presentations, software, video and/or audio clips, and a variety of other information items that may be exchanged independently, or as attachments. The access device 124, the gateway 118, and/or the wireless carrier central office 114b, for example, may then associate the identified information items of interest with the information identifying the parties of the current communication session or activity (block 718). The associated information items and identifying information from the current communication session or activity may then be stored in a database, for later access (block 720). The method then determines whether the communication session or activity has ended (block 722). If the communication session or activity has ended, the method of FIG. 7A ends (block 724). If, however, the communication session or activity has not ended, the method of FIG. 7A loops back, and processes the next exchanged message in the same fashion (block 714).

FIG. 7B shows a flowchart 700 illustrating an exemplary method supporting the delivery of enhanced caller ID information using the database of information items identified during the collection of enhanced caller identification (ID) information illustrated in FIG. 7A, in accordance with a representative embodiment of the present invention. The method of FIG. 7B begins at the start of a communication session or activity involving, for example, an access device, a gateway, or a wireless carrier central office such as the access device 124 or the gateway 118 of FIG. 3A, or the wireless carrier central office 114b of FIG. 2 (Block 750). At some point after the start of the communication session or activity, the access device 124, the gateway 118, and/or the wireless carrier central office 114b may receive information identifying the parties of the communication session or activity (block 752). This information may comprise conventional caller ID information such as, for example, the directory number and/or name of the called and/or calling party, or it may comprise electronic serial number(s), Internet protocol (IP) address(es), media access control (MAC) address(es), International Mobile Station Identifier (IMSI) address(es), Mobile Identification Number (MIN) address(es), and International Mobile Equipment Identity (IMEI) address(es), to name only a few such identifiers. The access device 124, the gateway 118, and/or the wireless carrier central office 114b, for example, may then select, from the database of information items collected during prior communication sessions or activities, those items of information that were previously associated with parties of the current communication session or activity (block 754). Such information items may comprise, for example, email addresses, URLs, file paths, and telephone directory numbers that may be embedded within the messaging, and documents, spreadsheets, slide presentations, software, video and/or audio clips, and a variety of other information items that may be exchanged independently, or as attachments. The access device 124, gateway 118, and/or wireless carrier central office 114b, for example, may then provide or make available to the participants in the current communication session or activity, the selected information items (block 756). This may take the form of a display such as those shown in FIGS. 5A, 5B, and 5C, for example. As described previously, the items actually presented to a user may be determined based upon user-selected parameters such as, for example, those illustrated in the enhanced caller ID information selection screen 620 of FIG. 6A. The method illustrated in FIG. 7B then ends.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1×RT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a modem configured for data communication with one or more broadband networks, including at least one of a digital subscriber line (DSL) network, a cable network, a satellite network, a cellular network and the internet;
a wireless interface configured to establish a wireless local area network (WLAN) in a vicinity around the wireless interface for wireless communication with one or more access devices over the WLAN;
a database operative to store historical information obtained from past calls between the modem and the wireless interface;
a gateway configured for data communication with the modem and the wireless interface to enable broadband network access to the one or more broadband networks by the one or more access devices communicating over the WLAN, the gateway configured to
communicate multimedia information among the wireless interface and the broadband network;
communicate information with the one or more access devices through the wireless interface;
communicate information of a user-to-user call between a called user of an access device and a calling user in communication with the gateway over the modem and a broadband network of the one or more broadband networks;
receive information of the user-to-user call identifying the calling user;
using the information identifying the calling user, search the database to identify sources of additional information related to the calling user;
retrieving information about the calling user from the identified sources using the information identifying the calling user;
retrieving from the database information selection parameters of the called party, the information selection parameters being stored in response to user selections made by the called party to select or deselect items of information to be provided to the called party;
using the information selection parameters, selecting from the retrieved information items of information about the calling user desired by the called user; and
communicating the selected items of information to the wireless interface for delivery to the access device of the called user.

2. The system of claim 1 wherein the wireless interface comprises an interface in accordance with the Institute of Electrical and Electronic Engineers (IEEE) standard 802.11 a, b, g or n for establishing the WLAN.

3. The system of claim 1 wherein the gateway is further configured to:
communicate with the one or more access devices to obtain additional information about the calling user from the one or more access devices.

4. The system of claim 1 wherein the gateway is further configured to:
communicate over the modem and the broadband network with one or more remote devices to obtain additional information about the calling user from the one or more remote devices.

5. The system of claim 1 wherein the gateway is further configured to:
collect call-related information during the user-to-user call between the called user and the calling user;
store the collected call-related information; and
present to the called user or the calling user, or both, the collected call-related information as part of the user-to-user call.

6. The system of claim 5 wherein the gateway is further configured to:
receive filtering parameters from the called user or the calling user, or both; and
present to the called user or the calling user the collected call-related information as filtered according to the filtering parameters received from the respective user.

7. The system of claim 1 wherein the gateway is further configured to:
collect additional information obtained by the one or more access devices during the user-to-user call.

8. The system of claim 7 wherein the gateway is further configured to:
collect multimedia data obtained by the one or more access devices during the user-to-user call.

9. The system of claim 7 wherein the gateway is further configured to:
provide to the one or more access devices information about the collected multimedia data obtained by the one or more access devices for further use.

10. The system of claim 1 wherein the gateway is further configured to:
identify in the database an access device of the one or more access devices as a source of additional information related to the calling user; and
retrieve information about the calling user from the identified access device.

11. The system of claim 1 wherein the gateway is further configured to:
identify in the database a remote source of additional information related to the calling user, the remote source being accessible by the gateway over the modem and the broadband network; and
retrieving information about the calling user from the remote sources using the information identifying the calling user and communicating with the remote source over the modem and the broadband network.

12. A method comprising:
at a gateway device,
establishing a wireless local area network (WLAN) through a wireless interface, the wireless interface configured for wireless communication over the WLAN with a plurality of access devices in a service area of the gateway device;
establishing data communication over a modem with a broadband network, the broadband network including at least one of a digital subscriber line (DSL) network, a cable network and a cellular network;

communicating data between respective access devices of the plurality of access devices and the broadband network;

receiving from users of respective access devices information selection parameters, the information selection parameters being received by the gateway in response to user selections made by the users of the respective access devices to control display of information about a received call received at the respective access devices;

storing the received information selection parameters;

subsequently, receiving a user-to-user call originated by a calling user on a calling device a and intended for a called user, including, receiving over the broadband network identification data defining the calling user or the calling device, the calling device accessing the gateway over the broadband network, and locating the called user on a called device which is in radio communication on the WLAN with the wireless interface;

retrieving from storage the information selection parameters of the called user;

using the retrieved information selection parameters of the called user, filtering items of caller identification information for presentation to the called user; and communicating over the wireless interface and the WLAN a communication including the filtered caller identification information before completing the user-to-user call.

13. The method of claim 12 wherein storing the received information selection parameters comprises storing the received information selection parameters by the gateway in a database.

14. The method of claim 12 wherein storing the received information selection parameters comprises:

at the gateway, communicating with a selected access device of the plurality of access devices; and storing the received information selection parameters at the selected access device for subsequent retrieval by the gateway.

15. The method of claim 12 further comprising:

at the gateway, communicating multimedia information over the WLAN and the wireless interface with an access device of the plurality of access devices;

communicating the multimedia information with another access device of the plurality of access devices;

analyzing the communicated multimedia information to identify information items; and storing the identified information items.

16. The method of claim 15 wherein storing the identified information items comprises communicating information about the identified information items to an access device of the plurality of access devices over the WLAN for storage.

17. The method of claim 12 further comprising:

at the gateway, communicating multimedia information over the WLAN and the wireless interface with an access device of the plurality of access devices;

communicating the multimedia information with a remote device over the modem and the broadband network;

analyzing the communicated multimedia information to identify information items; and storing the identified information items.

18. The method of claim 17 wherein using the retrieved information selection parameters of the called user, filtering at least some of the identified information items for presentation to the called user.

* * * * *